(12) United States Patent
Zhang et al.

(10) Patent No.: US 10,890,781 B2
(45) Date of Patent: Jan. 12, 2021

(54) LENS DRIVE DEVICE, CAMERA MODULE, AND CAMERA-EQUIPPED DEVICE

(71) Applicants: Yulin Zhang, Shanghai (CN); Masayoshi Sugawara, Tokyo (JP)

(72) Inventors: Yulin Zhang, Shanghai (CN); Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/478,945

(22) PCT Filed: Jan. 15, 2018

(86) PCT No.: PCT/JP2018/000772
§ 371 (c)(1),
(2) Date: Jul. 18, 2019

(87) PCT Pub. No.: WO2018/135423
PCT Pub. Date: Jul. 26, 2018

(65) Prior Publication Data
US 2020/0041811 A1  Feb. 6, 2020

(30) Foreign Application Priority Data

Jan. 18, 2017  (CN) .......................... 2017 1 0034450

(51) Int. Cl.
*G02B 27/64* (2006.01)
*G02B 7/09* (2006.01)
(Continued)

(52) U.S. Cl.
CPC ............. *G02B 27/646* (2013.01); *G02B 7/09* (2013.01); *G03B 3/10* (2013.01); *G03B 5/06* (2013.01);
(Continued)

(58) Field of Classification Search
None
See application file for complete search history.

(56) References Cited

U.S. PATENT DOCUMENTS

2009/0147340 A1* 6/2009 Lipton ................. G02B 27/646
359/230
2011/0141564 A1   6/2011 Sata et al.
(Continued)

FOREIGN PATENT DOCUMENTS

JP  2008-040188 A  2/2008
JP  2011-141517 A  7/2011
(Continued)

OTHER PUBLICATIONS

International Search Report from International Application No. PCT/JP2018/000772 dated Apr. 17, 2018.
Extended European Search Report dated Aug. 20, 2020.

*Primary Examiner* — Derek S. Chapel
(74) *Attorney, Agent, or Firm* — Brundidge & Stanger, P.C.

(57) ABSTRACT

A lens driving device includes two pairs of an image-stabilization coil part and an image-stabilization magnet part disposed along a first side and a second side that are adjacent to each other, respectively. An autofocus movable part is disposed eccentrically with respect to a central axis along the direction of the optical axis. An image-stabilization fixed part includes connection terminal parts that are respectively disposed on the first side and the second side, and are connected to power supply wiring of the image-stabilization coil part.

10 Claims, 16 Drawing Sheets

(51) Int. Cl.
*G03B 3/10* (2006.01)
*G03B 5/06* (2006.01)
*H04N 5/232* (2006.01)
*H04N 5/247* (2006.01)
*B60R 11/04* (2006.01)

(52) U.S. Cl.
CPC ......... *H04N 5/23287* (2013.01); *H04N 5/247* (2013.01); *B60R 11/04* (2013.01); *G03B 2205/0015* (2013.01)

(56) References Cited

U.S. PATENT DOCUMENTS

| | | |
|---|---|---|
| 2013/0016427 A1 | 1/2013 | Sugawara |
| 2015/0212336 A1* | 7/2015 | Hubert ................. G02B 27/646 |
| | | 348/208.11 |
| 2016/0131923 A1* | 5/2016 | Hu ........................ G02B 7/10 |
| | | 359/557 |
| 2017/0192195 A1 | 7/2017 | Murakami |
| 2019/0294026 A1* | 9/2019 | Sugawara ................ G03B 5/04 |
| 2020/0033699 A1* | 1/2020 | Kim ........................ G03B 5/06 |

FOREIGN PATENT DOCUMENTS

| | | |
|---|---|---|
| JP | 2013-024938 A | 2/2013 |
| JP | 2016-020939 A | 2/2016 |
| WO | 2016156996 A1 | 10/2016 |

\* cited by examiner

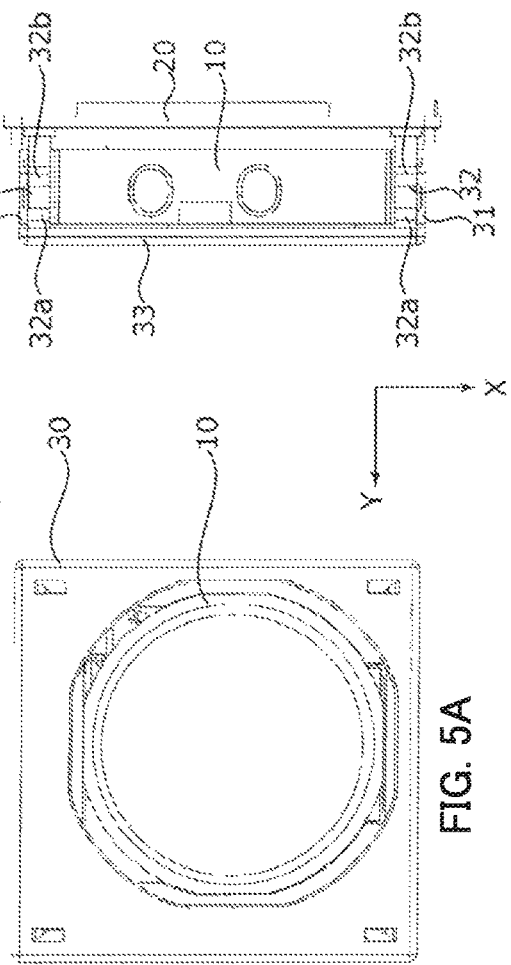
FIG. 5A
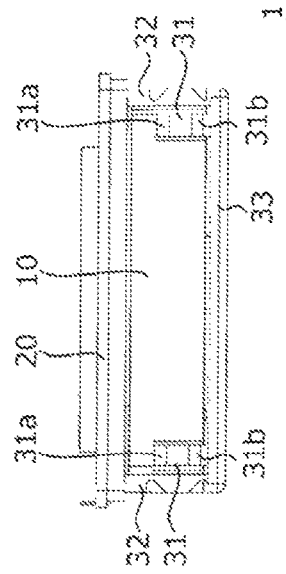
FIG. 5C
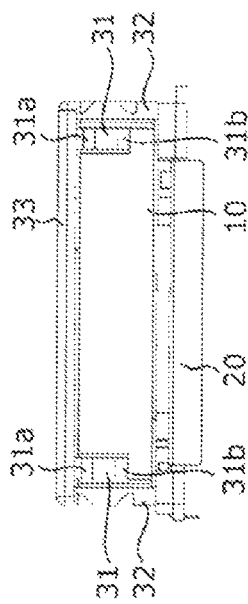
FIG. 5B
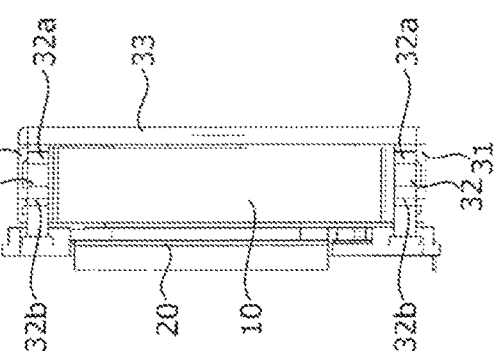
FIG. 5D
FIG. 5E

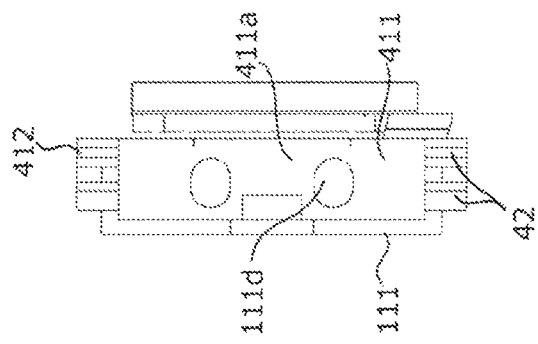
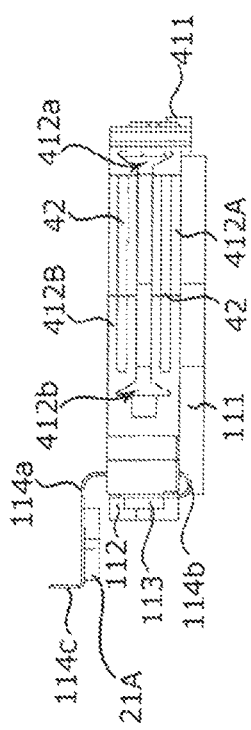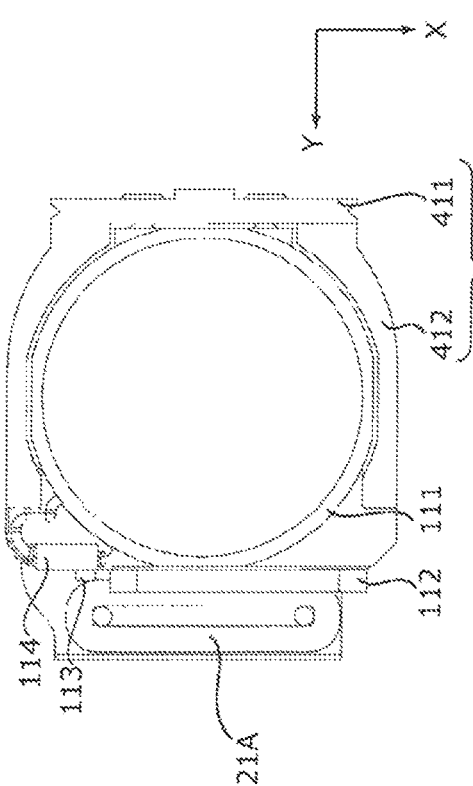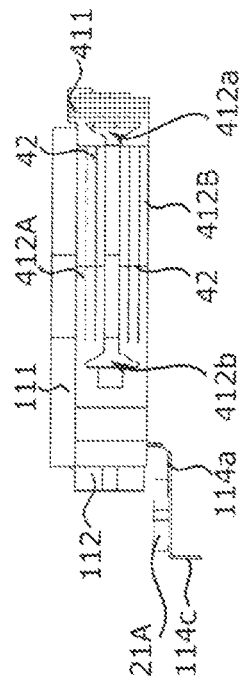
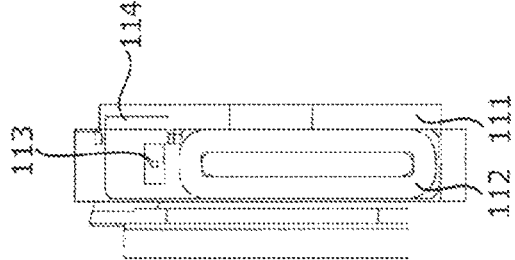

LENS DRIVE DEVICE, CAMERA MODULE, AND CAMERA-EQUIPPED DEVICE

TECHNICAL FIELD

The present invention relates to a lens driving device for optical image stabilization, a camera module including an optical image stabilization function, and a camera-equipped device.

BACKGROUND ART

A mobile terminal such as a smart phone is generally equipped with a small camera module. A lens driving device that includes an autofocus function (hereinafter, referred to as "AF function") and an optical image stabilization function (hereinafter, referred to as "OIS function") is applied to such a camera module (for example, PTL 1). The AF function automatically achieves focusing when an object is imaged. The OIS function optically corrects shake (vibration) occurred in imaging to reduce image disturbance.

The lens driving device including the autofocus function and the optical image stabilization function includes an autofocus driving section (hereinafter, referred to as "AF driving section") to move a lens part in an optical axis direction, and an optical image stabilization driving section (hereinafter, referred to as "OIS driving section") to sway the lens part in a plane orthogonal to the optical axis direction.

The AF driving section includes, for example, an autofocus coil part (hereinafter, referred to as "AF coil part"), an autofocus magnet part (hereinafter, referred to as "AF magnet part"), and an elastic supporting part (for example, plate spring). The AF coil part is disposed around the lens part. The AF magnet part is disposed apart from the AF coil part in a radial direction. The elastic supporting part elastically supports an autofocus movable part (hereinafter, referred to as "AF movable part") with respect to an autofocus fixing part (hereinafter, referred to as "AF fixing part") including, for example, the AF magnet part. The AF movable part includes the lens part and the AF coil part. The AF driving section automatically achieves focusing by moving the AF movable part in the optical axis direction relative to the AF fixing part with use of driving force from a voice coil motor including the AF coil part and the AF magnet part. Note that the AF fixing part includes the AF coil part, and the AF movable part includes the AF magnet part in some cases.

The OIS driving section includes, for example, an optical image stabilization magnet part (hereinafter, referred to as "OIS magnet part"), an optical image stabilization coil part (hereinafter, referred to as "OIS coil part"), and a supporting part. The OIS magnet part is disposed in the AF driving section. The OIS coil part is disposed apart from the OIS magnet part. The supporting part supports an optical image stabilization movable part (hereinafter, referred to as "OIS movable part") with respect to an optical image stabilization fixing part (hereinafter, referred to as "OIS fixing part"). The OIS fixing part includes the OIS coil part, and the OIS movable part includes the AF driving section and the OIS magnet part. The OIS driving section performs the optical image stabilization by swaying the OIS movable part in a plane orthogonal to the optical axis direction relative to the OIS fixing part with use of driving force from a voice coil motor including the OIS magnet part and the OIS coil part (so-called barrel shift system). The OIS magnet part can be also used as the AF magnet part. In this case, it is possible to achieve reduction in size and height of the lens driving device. Further, as the supporting part supporting the OIS movable part to the OIS fixing part, for example, a suspension wire is adopted.

CITATION LIST

Patent Literature

PTL 1
Japanese Patent Application Laid-Open No. 2013-24938

SUMMARY OF INVENTION

Technical Problem

In recent years, practical realization of a camera module including a plurality of (typically, two) lens driving devices is progressing (so-called dual camera). The dual camera has various possibilities depending on use scene, for example, simultaneous capturing of two images different in focal length, and simultaneous capturing of a still image and a moving image. In the case of the dual camera, the size is increased as compared with a single camera. Therefore, it is necessary to further downsize the lens driving device for commercialization.

An object of the present invention is to provide a lens driving device suitable for a dual camera, and a camera module and a camera-equipped device each including the lens driving device.

Solution to Problem

A lens driving device according to the present invention is a device having a rectangular shape in a planar view, the lens driving device including an optical image stabilization driving section that includes: an optical image stabilization magnet part; an optical image stabilization coil part; and an optical image stabilization supporting part, the optical image stabilization driving section being configured to perform optical image stabilization by swaying an optical image stabilization movable part in a plane orthogonal to an optical axis direction, relative to an optical image stabilization fixing part, with use of a driving force from an optical image stabilization voice coil motor, the optical image stabilization magnet part being disposed around a lens part, the optical image stabilization coil part being disposed apart from the optical image stabilization magnet part, the optical image stabilization supporting part supporting the optical image stabilization movable part including the optical image stabilization magnet part while the optical image stabilization movable part is separated in the optical axis direction from the optical image stabilization fixing part including the optical image stabilization coil part, the optical image stabilization voice coil motor including the optical image stabilization coil part and the optical image stabilization magnet part, in which:

the optical image stabilization movable part includes an autofocus driving section that includes an autofocus coil part, an autofocus magnet part, and an autofocus supporting part, the autofocus driving section being configured to automatically achieve focusing by moving an autofocus movable part in the optical axis direction relative to an autofocus fixing part with use of a driving force from an autofocus voice coil motor, the autofocus coil part being disposed around the lens part, the autofocus magnet part being disposed apart from the autofocus coil part in a radial direction, the autofocus supporting part supporting the autofocus movable part including the autofocus coil part, with respect to the autofocus fixing part including the autofocus magnet part, the autofocus voice coil motor including the autofocus coil part and the autofocus magnet part, a pair of the optical image stabilization coil part and the optical image stabilization magnet part is disposed along a first side and a second side adjacent to each other, the autofocus movable part is disposed to be eccentric from a center axis of the lens driving device that is parallel to the optical axis direction, and the optical image stabilization fixing part includes connection terminal parts that are disposed on the first side and the second side and are connected to a power feeding wire of the optical image stabilization coil part.

A camera module according to the present invention includes:

a first lens driving device and a second lens driving device each made up of the lens driving device described above;

the lens part corresponding to each of the first lens driving device and the second lens driving device; and an imaging section that captures an object image formed by the lens part, wherein the first lens driving device and the second lens driving device are arranged side by side in positional relationship in which the first lens driving device and the second lens driving device are rotated by 90 degrees from each other in a plane orthogonal to the optical axis to prevent the connection terminal parts from being located between the first lens driving device and the second lens driving device.

A camera-equipped device that is an information device or a transporting device includes the camera module described above.

Advantageous Effects of Invention

According to the present invention, the lens driving device suitable for a dual camera, and the camera module and the camera-equipped device each including the lens driving device are provided.

BRIEF DESCRIPTION OF DRAWINGS

FIG. 5A is a plan view illustrating a lens driving device, FIG. 5B is a front view illustrating the lens driving device, FIG. 5C is a back view illustrating the lens driving device, FIG. 5D is a left side view illustrating the lens driving device, and FIG. 5E is a right side view illustrating the lens driving device;

FIG. 8A is a plan view illustrating a state where an AF supporting part and an AF movable part are attached, FIG. 8B is a front view illustrating the state where the AF supporting part and the AF movable part are attached, FIG. 8C is a back view illustrating the state where the AF supporting part and the AF movable part are attached, FIG. 8D is a left side view illustrating the state where the AF supporting part and the AF movable part are attached, and FIG. 8E is a right side view illustrating the state where the AF supporting part and the AF movable part are attached;

DESCRIPTION OF EMBODIMENTS

An embodiment of the present invention will be described in detail below with reference to the accompanying drawings.

Figure 1A:
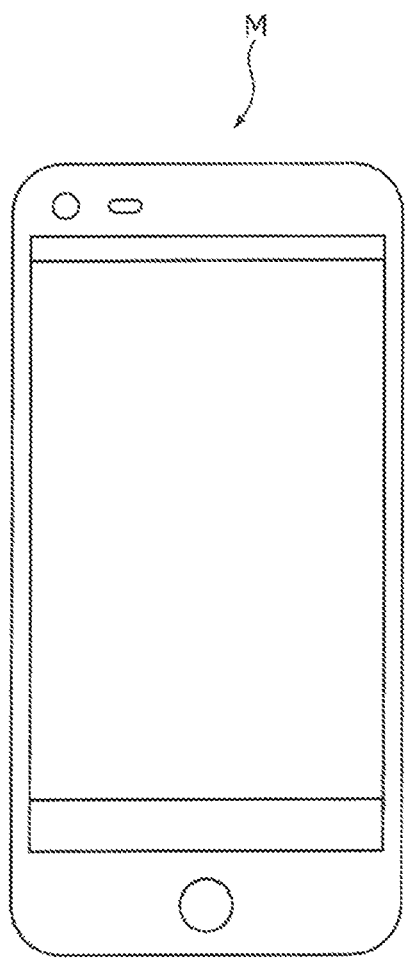
FIGS. 1A and 1B are diagrams each illustrating a smartphone equipped with a camera module according to an embodiment of the present invention.
Figure 1B:
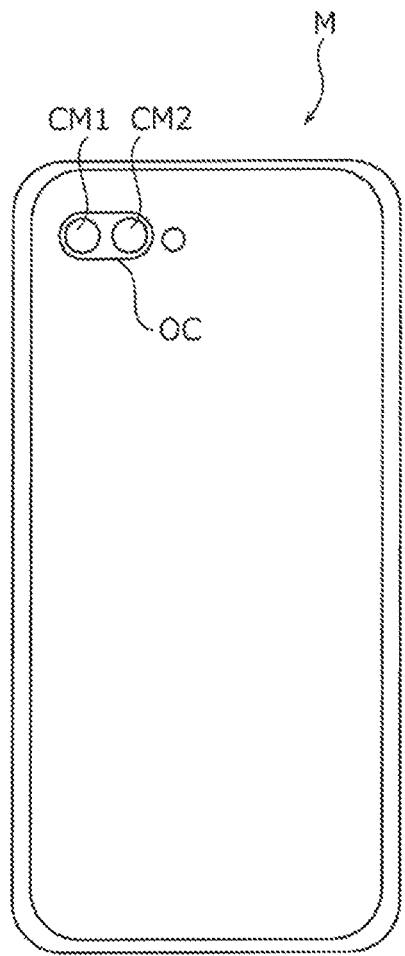

FIG. 1A and FIG. 1B are diagrams each illustrating smartphone M (camera-equipped device) equipped with camera modules CM1 and CM2 according to an embodiment of the present invention. FIG. 1A is a front view of smartphone M, and FIG. 1B is a back view of smartphone M.

As illustrated in FIG. 1A and FIG. 1B, smartphone M includes, as rear camera OS, a dual camera in which two camera modules CM1 and CM2 are arranged side by side. Each of camera modules CM1 and CM2 includes an autofocus function and an optical image stabilization function, and automatically achieves focusing when an object is imaged and corrects shake (vibration) occurred in imaging to capture an image without image blur.

Figure 2:
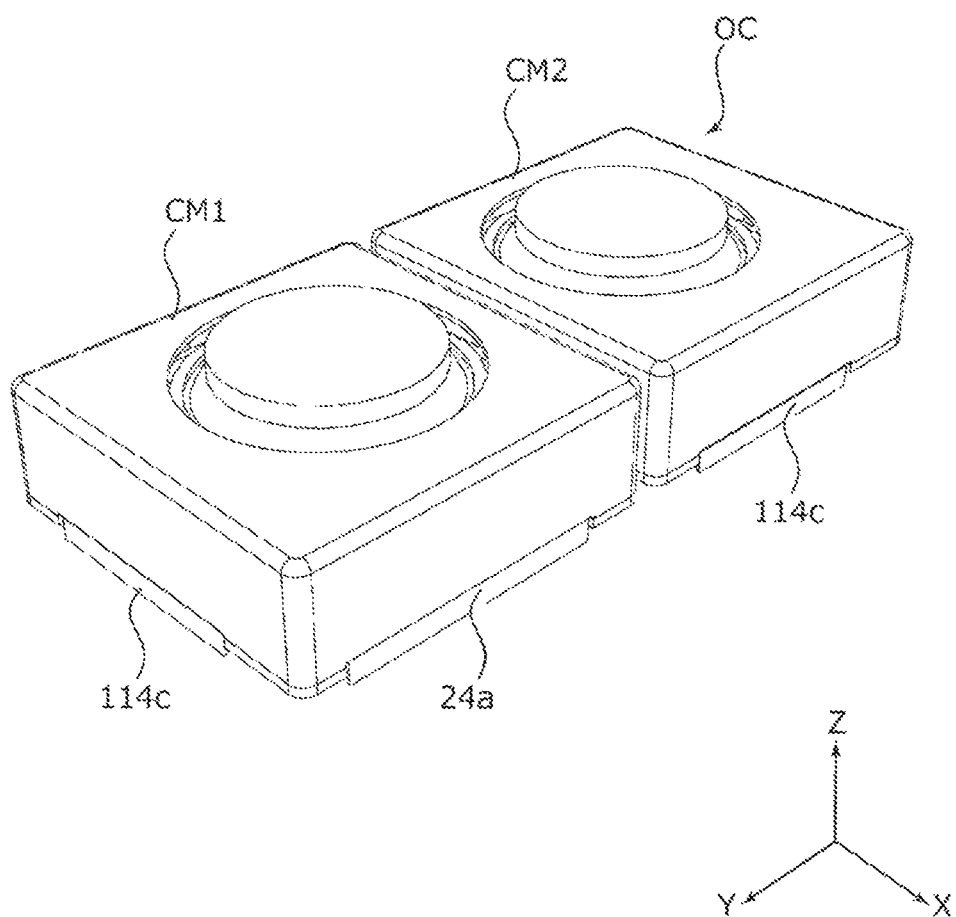
FIG. 2 is an appearance perspective view illustrating a rear camera.
Figure 3A:
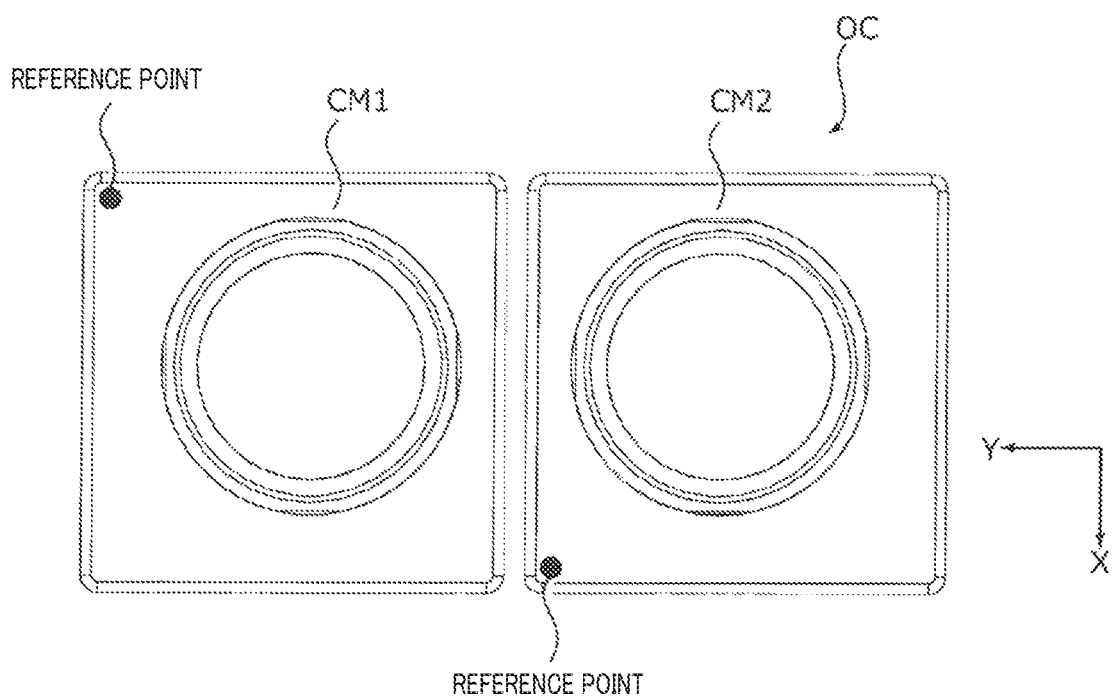
FIG. 3A is a plan view illustrating the rear camera as viewed from light-receiving side in an optical axis direction.
Figure 3B:
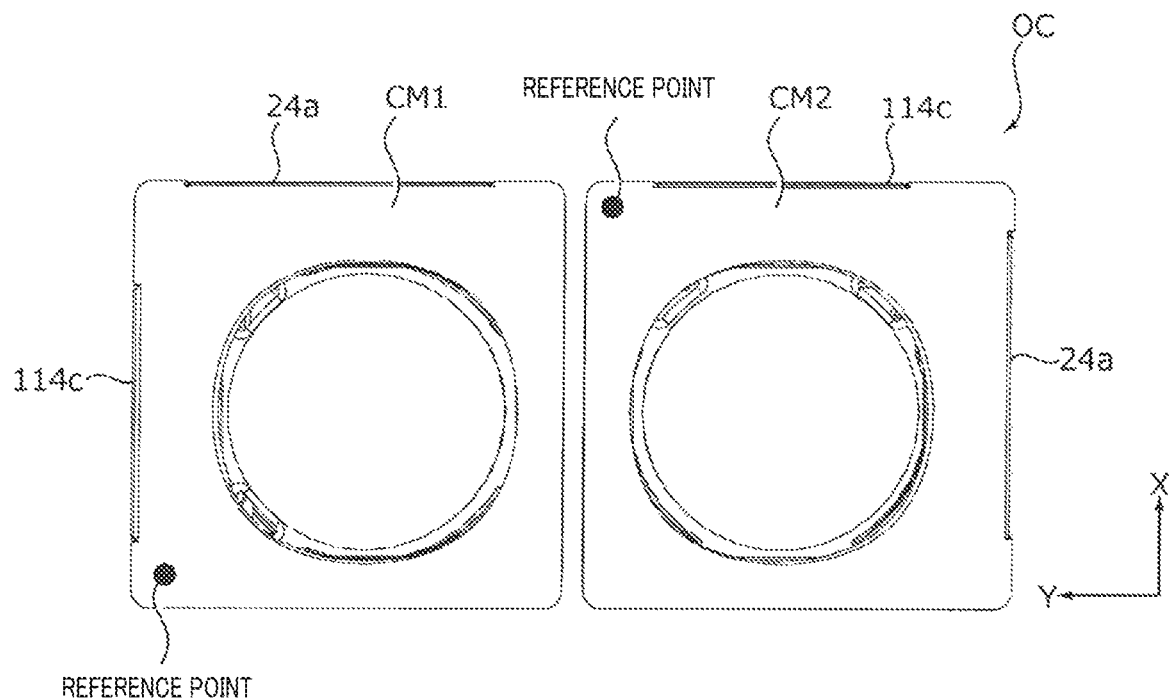
FIG. 3B is a plan view illustrating the rear camera as viewed from imaging side in the optical axis direction.

FIG. 2 is an appearance perspective view of rear camera OC. FIG. 3A is a plan view illustrating rear camera OC as viewed from light-receiving side in an optical axis direction. FIG. 3B is a plan view illustrating rear camera OC as viewed from imaging side in the optical axis direction. As illustrated in FIG. 2, FIG. 3A, and FIG. 3B, description is given with use of an orthogonal coordinate system (X, Y, Z) in the present embodiment. The common orthogonal coordinate system (X, Y, Z) is used in the drawings described below. Rear camera OC is equipped such that the X direction corresponds to a vertical direction (or right-left direction), the Y direction corresponds to the right-left direction (or vertical direction), and the Z direction corresponds to a front-rear direction when imaging is actually performed by smartphone M. In other words, the Z direction corresponds to the optical axis direction, an upper side in the figure corresponds to the right-receiving side in the optical direction (also referred to as "macro position side"), and a lower side in the figure corresponds to the imaging side in the optical axis direction (also referred to as "infinite position side"). Further, the X direction and the Y direction orthogonal to the optical axis direction are referred to as "optical-axis orthogonal directions".

In rear camera OC, camera modules CM1 and CM2 have the same structure. Camera modules CM1 and CM2 are disposed in positional relationship in which camera modules CM1 and CM2 are rotated by 90 degrees from each other in a plane orthogonal to the optical axis direction. In FIG. 3A and FIG. 3B, a reference point (black point) is provided on a surface on the light-receiving side in the optical axis direction and on a surface on the imaging side in the optical axis direction for description of the positional relationship between camera modules CM1 and CM2.

Figure 4:
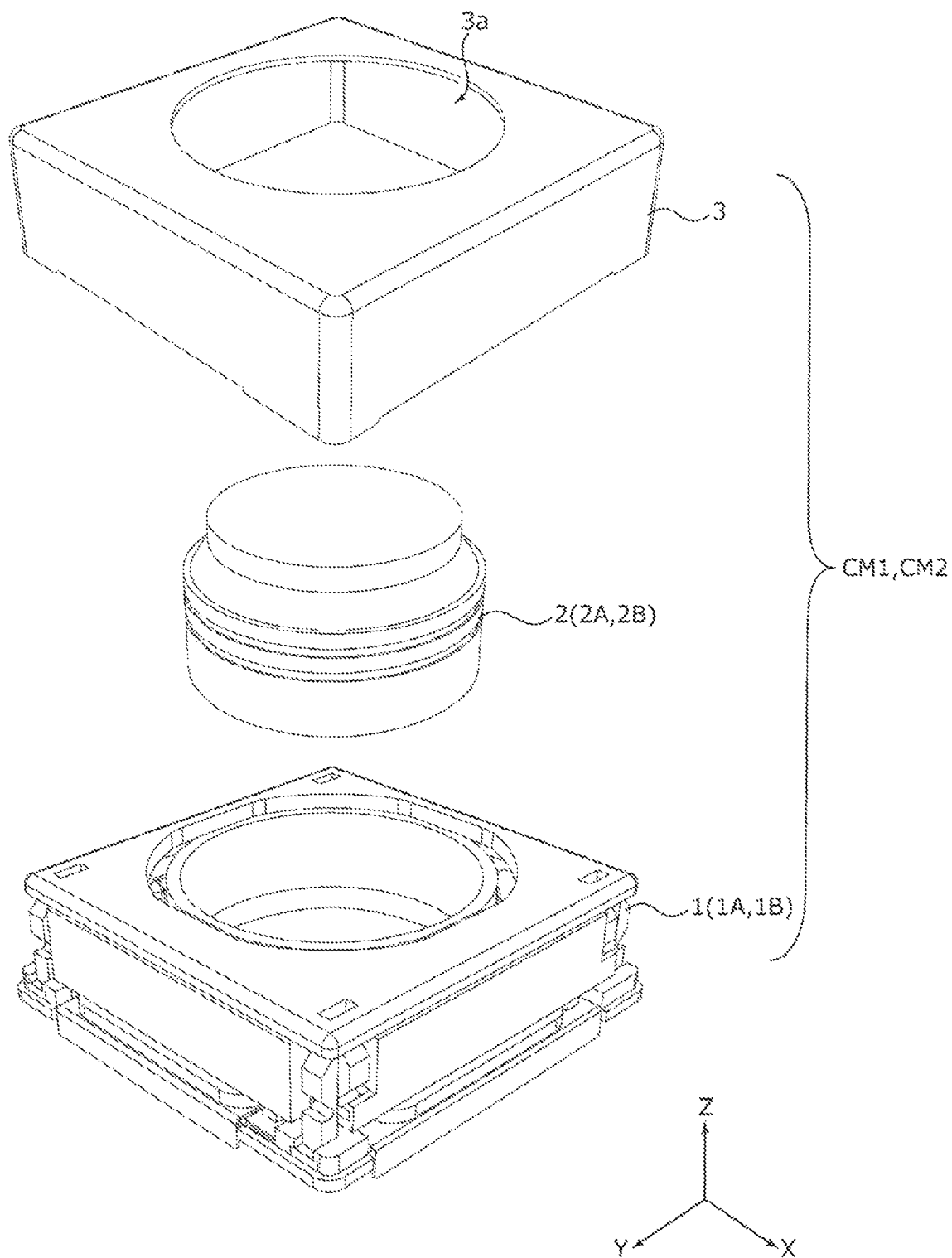
FIG. 4 is an exploded perspective view illustrating the camera module.

FIG. 4 is an exploded perspective view of camera modules CM1 and CM2.

Each of camera modules CM1 and CM2 includes lens part 2 in which a lens is accommodated in a cylindrical lens barrel, lens driving device 1 for AF and for OIS, an imaging section (not illustrated) that captures an object image formed by lens part 2, cover 3 that covers the entire components, and the like. In the following, in a case where lens driving device 1 and lens part 2 of camera modules CM1 and CM2 are distinguished from each other, these are referred to as "first lens driving device 1A", "first lens part 2A", "second lens drive device 1B", and "second lens part 2B".

Cover 3 is a covered square cylinder formed in a rectangular shape (square shape in this case) in a planar view as viewed from the optical axis direction, and includes circular opening 3a on a top surface. Opening 3a is provided so as to be eccentric from a center axis of cover 3 (axis that passes through intersection of diagonals of cover 3 in planar view and is parallel to optical axis direction), namely, a center axis of each of camera modules CM1 and CM2 (axis that passes through intersection of diagonals of each of camera modules CM1 and CM2 in planar view and is parallel to optical axis direction). Lens part 2 faces outside from opening 3a. Cover 3 is fixed to base 22 of OIS fixing part 20 (see FIG. 5A to FIG. 5E) of lens driving device 1. Note that cover 3 may be made of a conductive material and may be grounded through OIS fixing part 20.

The imaging section (not illustrated) includes an imaging device (not illustrated), and is disposed on the imaging side in the optical axis direction of the lens driving device 1, namely, on the imaging side in the optical axis direction of OIS fixing part 20. The imaging device (not illustrated) includes, for example, a CCD (charge-coupled device) image sensor or a CMOS (complementary metal oxide semiconductor) image sensor. The imaging device (not illustrated) captures the object image formed by lens part 2, and outputs an electric signal corresponding to the object image.

Figure 6:
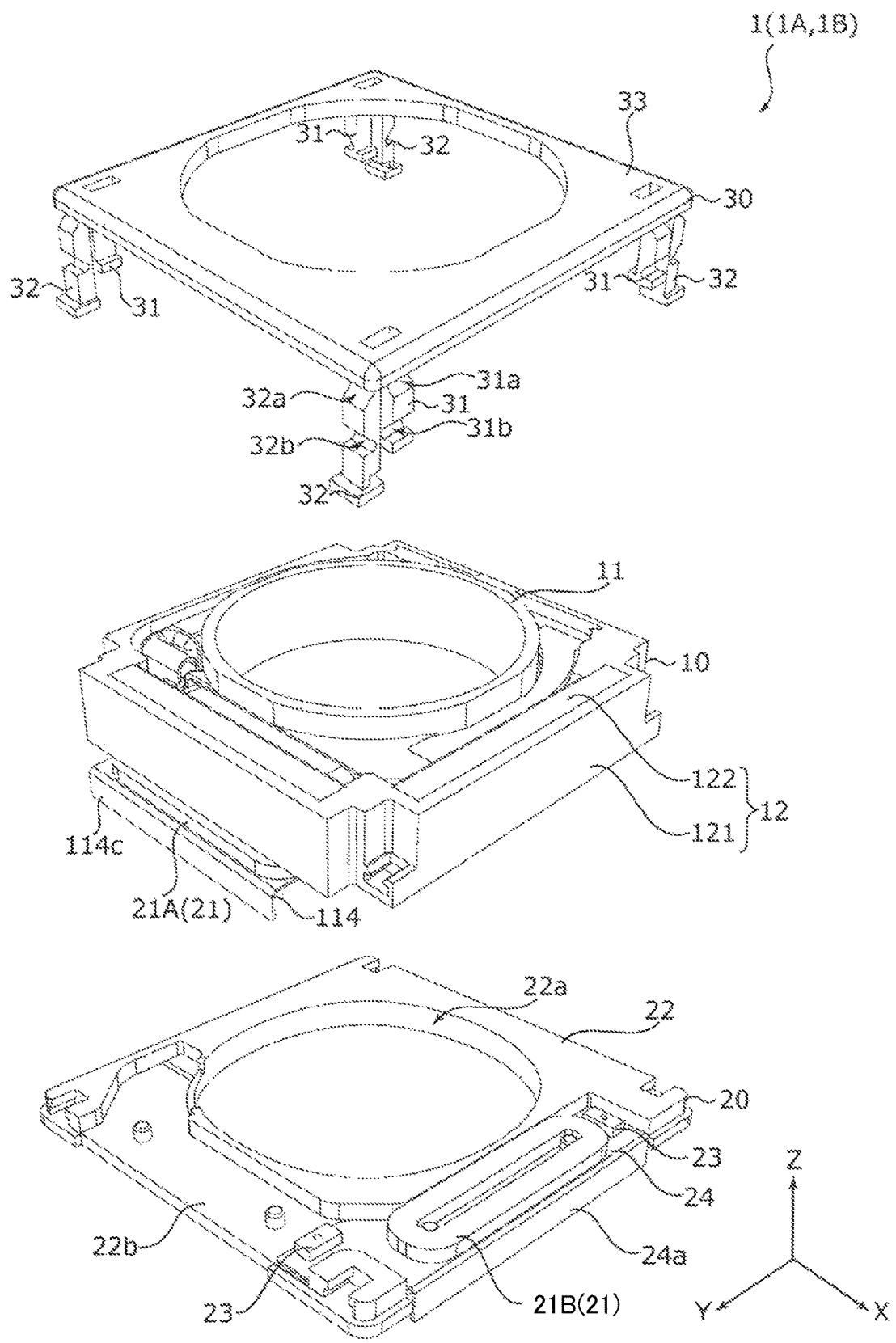
FIG. 6 is an exploded perspective view illustrating the lens driving device.

FIG. 5A to FIG. 5E are diagrams each illustrating lens driving device 1. FIG. 5A is a plan view, FIG. 5B is a front view, FIG. 5C is a back view, FIG. 5D is a left side view, and FIG. 5E is a right side view. Among FIG. 5A to FIG. 5E, the coordinate axes are illustrated only in FIG. 5A. FIG. 6 is an exploded perspective view of lens driving device 1.

As illustrated in FIG. 5A to FIG. 5E and FIG. 6, lens driving device 1 includes OIS movable part 10, OIS fixing part 20, OIS supporting part 30, and the like, and has a rectangular shape (square shape in this case) in a planar view. An axis that passes through an intersection of diagonals of lens driving device 1 in a planar view and is parallel to the optical axis direction is referred to as "center axis of lens driving device 1". The above-described center axis of cover 3, the above-described center axis of each of camera modules CM1 and CM2, a center axis of magnet holder 121 described below, and a center axis of base 22 described below are coincident with the center axis of lens driving device 1.

OIS movable part 10 includes OIS magnet part that constitutes an OIS voice coil motor, and is swung in a plane orthogonal to the optical axis in the optical image stabilization. OIS fixing part 20 includes an OIS coil part that constitutes the OIS voice coil motor, and supports OIS movable part 10 through OIS supporting part 30. In other words, a moving magnet system is adopted for an OIS driving section in lens driving device 1. OIS movable part 10 includes an AF driving section. OIS movable part 10 is disposed apart from OIS fixing part 20 so as to be movable in a plane orthogonal to the optical axis direction. In this case, OIS movable part 10 is disposed apart from OIS fixing part 20 toward the light-receiving side in the optical axis direction.

OIS supporting part 30 couples OIS fixing part 20 and OIS movable part 10. In the present embodiment, in place of an existing suspension wire, a link member that uses elasticity of elastomer is adopted as OIS supporting part 30 (hereinafter, referred to as "OIS link member 30"). The elastomer is a rubber-like elastic body, and includes thermosetting elastomer (rubber) and thermoplastic elastomer (plastic having elasticity).

As illustrated in FIG. 5A to FIG. 5E and FIG. 6, OIS link member 30 includes upper frame 33, first side supports 31, and second side supports 32. Note that a configuration common to first side supports 31 and second side supports 32 is described for "side supports 31 and 32".

Upper frame 33 is a frame formed in a rectangular shape (square shape in this case) in a planar view, and is disposed to face base 22 of OIS fixing part 20 in the optical axis direction. Upper frame 33 is made of a material with high rigidity. Although a metal material or a resin material is applicable to upper frame 33, the resin material is preferable in terms of weight reduction. Liquid crystal polymer (LCP resin) is particularly preferable for upper frame 33. When upper frame 33 is made of liquid crystal polymer, it is possible to prevent OIS movable part 10 from sinking due to own weight while reducing the weight, and to secure excellent tilt characteristics.

Side supports 31 and 32 are each made of an elastomer material. As a result, a risk of breakage of side supports 31 and 32 due to impact such as falling becomes extremely low as compared with a case where a suspension wire is used as the OIS supporting part. This makes it possible to secure high reliability and to enhance sensitivity of the OIS driving section (hereinafter, referred to as "OIS sensitivity") of lens driving device 1. Further, primary resonance of the OIS driving section can be suppressed with use of damping force of elastomer. This eliminates a process to coat a damper member that is performed in the case where the suspension wire is used, to facilitate assembling work, thereby improving productivity.

As the elastomer material, thermoplastic elastomer (for example, polyester elastomer) that allows for design of a small spring constant and injection molding, and is high in mass-productivity is suitable. The polyester elastomer is excellent in heat resistance and low-temperature characteristics, and has relatively stable flexibility even if temperature is changed.

Side supports 31 and 32 are columnar members each having strength enough to support OIS movable part 10. Two first side supports 31 or two second side supports 32 are disposed on each of four sides of upper frame 33. Note that side supports 31 and 32 may be plate-like members that cover side surfaces of the OIS movable part. Each of side supports 31 and 32 includes a biaxial hinge structure that is bent around two axes to enable OIS movable part 10 to translate in a plane orthogonal to the optical axis.

More specifically, each of first side supports 31 includes two Y hinge parts 31a and 31b that are formed thinner than surroundings and have an axis in the Y direction. In this case, Y hinge parts 31a and 31b are each made up of a hinge groove provided on an outer surface of each of first side supports 31.

Each of second side supports 32 has a shape similar to the shape of each of first side supports 31. More specifically, each of second side supports 32 includes two X hinge parts 32a and 32b that are formed thinner than surroundings and extend in the X direction. In this case, X hinge parts 32a and 32b are each made up of a hinge groove provided on an outer surface of each of second side supports 32.

The shape of the hinge groove in each of first side supports 31 and second side supports 32 is not particularly limited; however, the hinge groove preferably has an R-shape. This improves durability against bending operation repeatedly performed in the optical image stabilization.

First side supports 31 are suspended at ends of each of two sides along the Y direction, of upper frame 33. One of ends of each of first side supports 31 is fixed to upper frame 33, and the other end is fixed to OIS movable part 10 (in this case, magnet holder 121).

Second side supports 32 are suspended at ends of each of two sides along the X direction, of upper frame 33. One of ends of each of second side supports 32 is fixed to upper frame 33, and the other end is fixed to OIS fixing part 20 (in this case, base 22).

Upper frame 33 of OIS link member 30 is laid on the light-receiving side in the optical axis direction of OIS fixing part 20 by second side supports 32. Further, OIS movable part 10 is suspended from upper frame 33 by first side supports 31.

Accordingly, when OIS movable part 10 is moved in the Y direction, only second side supports 32 are elastically deformed and first side supports 31 are not elastically deformed. In contrast, when OIS movable part 10 is moved in the X direction, only first side supports 31 are elastically deformed and second side supports 32 are not elastically deformed. In other words, OIS movable part 10 can be independently moved in the X direction and the Y direction.

As described above, OIS supporting part 30 includes upper frame 33 that is disposed to face OIS fixing part 20 in the optical axis direction, first side supports 31 that are disposed to face the X direction (first direction orthogonal to optical axis direction) and each couple upper frame 33 and OIS movable part 10, and second side supports 32 that are disposed to face the Y direction (second direction orthogonal to optical axis direction and first direction) and each couple upper frame 33 and OIS fixing part 20. Each of first side supports 31 includes two Y hinge parts 31a and 31b that are formed thinner than surroundings and have an axis in the Y direction, and is bent along with movement of OIS movable part 10 in the X direction such that two Y hinge parts 31a and 31b are bent in directions opposite to each other (see FIG. 10A and FIG. 10B). Each of second side supports 32 includes two X hinge parts 32a and 32b that are formed thinner than surroundings and have an axis in the X direction, and is bent along with movement of OIS movable part 10 in the Y direction such that two X hinge parts 32a and 32b are bent in directions opposite to each other (see FIG. 11A and FIG. 11B).

In a case where the OIS supporting part is made up of a suspension wire as with the existing technology, a wire diameter of the suspension wire is preferably small in order to improve the OIS sensitivity. When the wire diameter of the suspension wire is made small, however, a risk of breakage when the suspension wire receives impact such as falling is increased. In addition, the suspension wire is easily deflected and the OIS movable part cannot translate (lens part is inclined). This deteriorates the tilt characteristics in the optical image stabilization. The tilt characteristics are indices representing parallelism of the OIS movable part in the optical image stabilization, and are expressed by an inclination angle of the lens part along with movement of the OIS movable part. As described above, when the wire diameter of the suspension wire is made small to enhance the OIS sensitivity, reliability of the lens driving device is impaired.

In contrast, in the present embodiment, the mechanical hinge structure using elasticity of elastomer is adopted as OIS supporting part 30 to secure parallelism of OIS movable part 10. This improves the tilt characteristics. Further, the risk of breakage of OIS supporting part 30 due to impact such as falling becomes extremely low, which makes it possible to drastically reduce influence of resonance on AF movable part 11. Furthermore, since OIS movable part 10 can be moved by small force, it is possible to achieve power saving.

Figure 7:
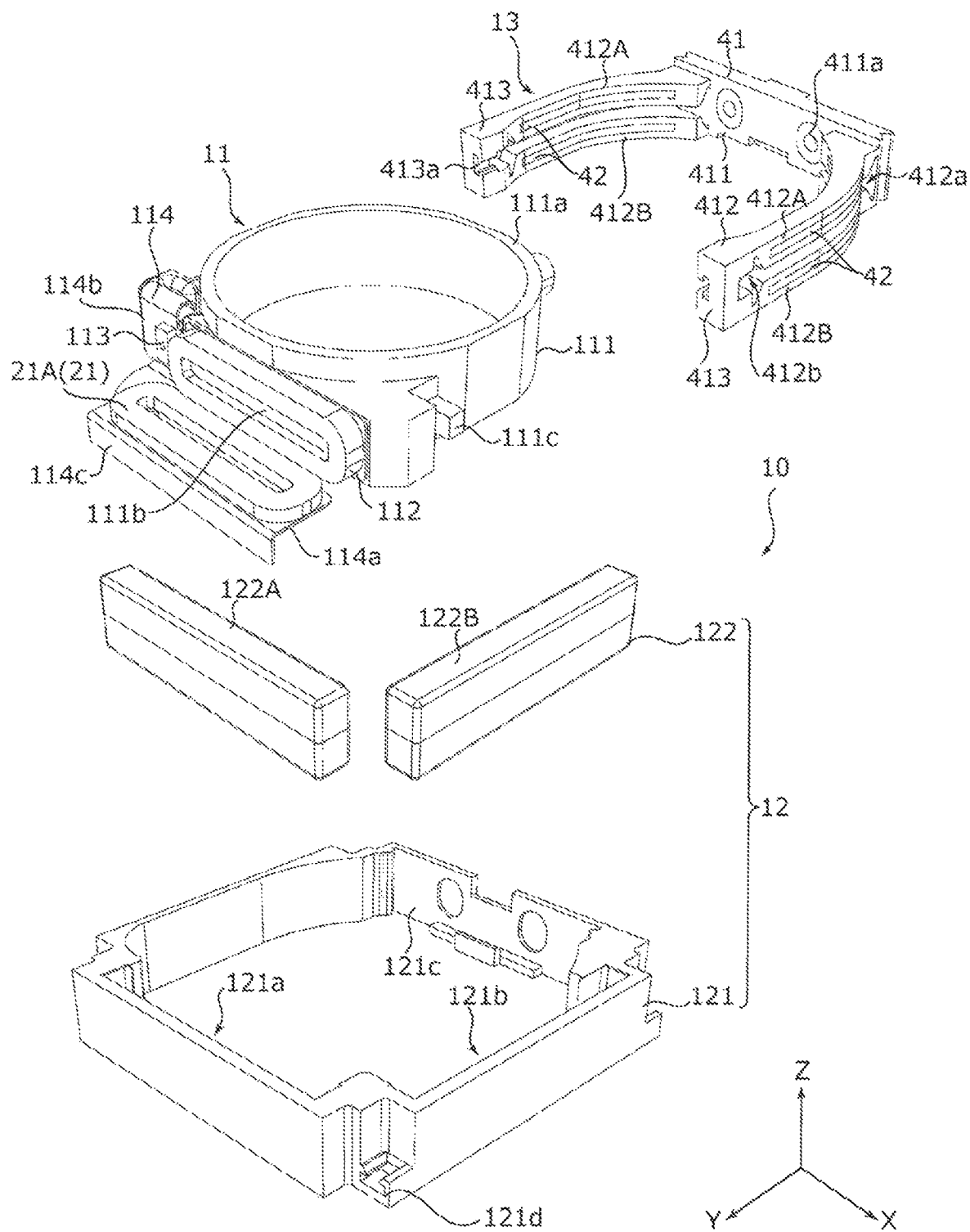
FIG. 7 is an exploded perspective view illustrating an OIS movable part.
Figure 9A:
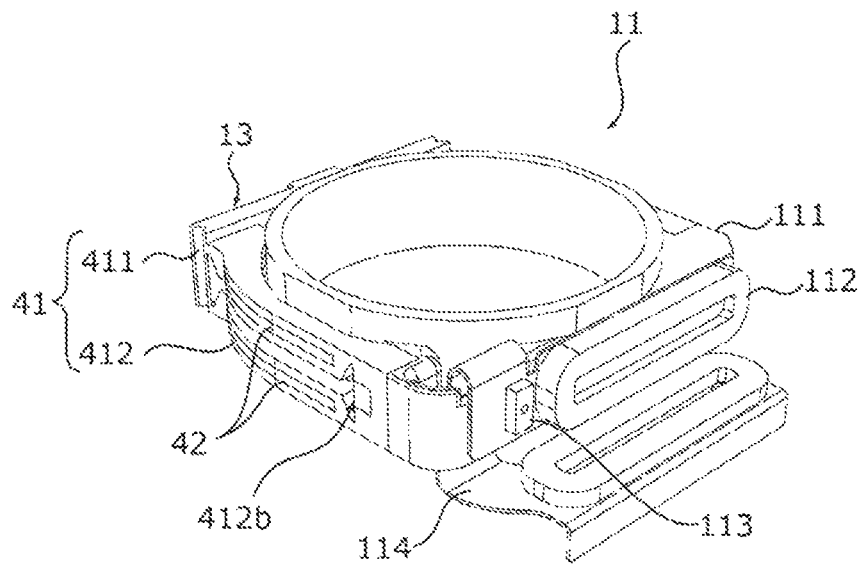
FIGS. 9A and 9B are perspective views each illustrating the state where the AF supporting part and the AF movable part are attached.
Figure 9B:
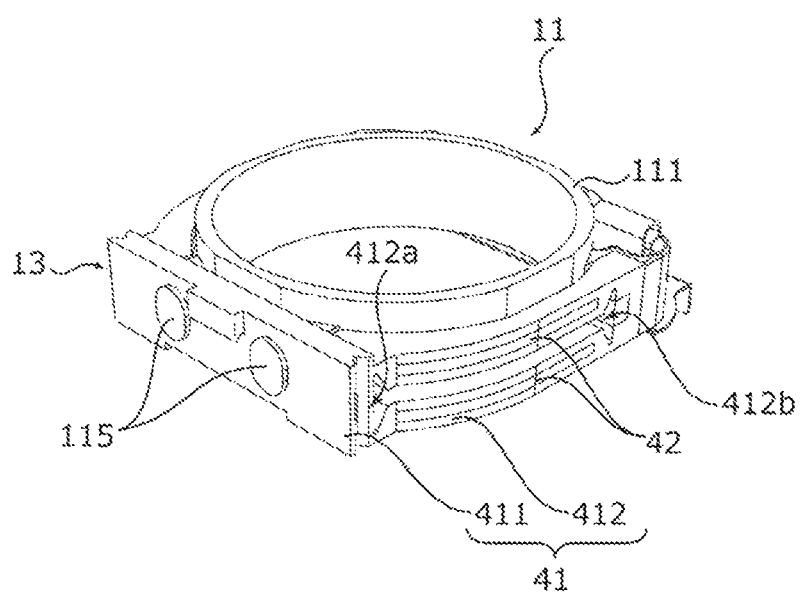

FIG. 7 is an exploded perspective view illustrating OIS movable part 10. FIG. 8A to FIG. 8E are diagrams each illustrating a state where AF supporting part 13 and AF movable part 11 are attached. FIG. 8A is a plan view, FIG. 8B is a front view, FIG. 8C is a back view, FIG. 8D is a left side view, and FIG. 8E is a right side view. Among FIG. 8A to FIG. 8E, the coordinate axes are illustrated only in FIG. 8A. FIG. 9A and FIG. 9B are perspective views each illustrating the state where AF supporting part 13 and AF movable part 11 are attached.

As illustrated in FIG. 7, FIG. 8A to FIG. 8E, and FIG. 9A and FIG. 9B, OIS movable part 10 includes AF movable part 11, AF fixing part 12, AF supporting part 13, and the like. AF movable part 11 is disposed apart from AF fixing part 12 toward the inside in a radial direction, and is coupled to AF fixing part 12 by AF supporting part 13.

AF movable part 11 includes AF coil part 112 constituting an AF voice coil motor and is moved in the optical axis direction in focusing. AF fixing part 12 includes AF magnet part 122A constituting the AF voice coil motor, and supports AF movable part 11 through AF supporting part 13. In other words, a moving coil system is adopted for the AF driving section of lens driving device 1.

AF movable part 11 includes lens holder 111, AF coil part 112, AF position detection part 113, and FPC (flexible printed circuit) 114.

Lens holder 111 includes cylindrical lens accommodation part 111a to which lens part 2 is fixed by bonding or screwing. Lens holder 111 includes, on a side surface along the X direction, coil attachment part 111b at which AF coil part 112 is disposed. In addition, lens holder 111 includes link attachment parts 111c on two side surfaces along the Y direction.

AF coil part 112 is an air-core coil energized in focusing, and is wound round coil attachment part 111b of lens holder 111. Both ends of the winding of AF coil part 112 are connected to FPC 114. AF coil part 112 has an elliptical shape and is disposed such that a coil surface is parallel to the optical axis and an XZ surface becomes the coil surface in this case. AF coil part 112 faces magnet part 122 (first magnet 122A).

FPC 114 is a flexible printed circuit on which AF position detection part 113 is mounted. FPC 114 includes planar part 114a disposed on the imaging side in the optical axis direction of lens holder 111, and sensor attachment part 114b that stands on planar part 114a, is bent in a U-shape, and is disposed adjacently to coil attachment part 111b of lens holder 111. Planar part 114a of FPC 114 extends outward from lens holder 111, and is disposed on FPC attachment part 22b of base 22. First OIS coil 21A constituting OIS coil part 21 is disposed on planar part 114a.

FPC 114 includes a power supply line (not illustrated) to feed power to AF coil part 112, AF position detection part 113, and first OIS coil 21A, a signal line (not illustrated) for a detection signal output from AF position detection part 113, and the like. An end part of planar part 114a is bent toward the imaging side in the optical axis direction, and connection terminal 114c (in this case, 8 pin) is provided at the end part.

AF position detection part 113 is, for example, a Hall element that detects a magnetic field with use of Hall effect (hereinafter, referred to as "AF Hall element 113"). AF Hall element 113 mainly detects a magnetic field formed by first magnet 122A. The position of AF movable part 11 in the optical axis direction can be specified based on a detection result of AF Hall element 113. AF Hall element 113 is used to perform focusing by closed loop control. AF Hall element 113 is mounted on sensor attachment part 114b of FPC 114.

As described above, AF movable part 11 includes AF Hall element 113 (AF position detection part) that is disposed on a surface (XZ surface in figure) intersecting the extending direction of arms 412 and detects the position of AF movable part 11 in the optical axis direction based on change of the magnetic field. Note that a position detection magnet may be disposed on AF fixing part 12, besides first magnet 122A.

In the present embodiment, AF movable part 11 is supported by AF supporting part 13 that is attached to AF fixing part 12 in a cantilever manner. In this case, vibration (resonance) easily occurs in a direction intersecting the extending direction of arms 412 of AF supporting part 13. Accordingly, if AF Hall element 113 is disposed on a surface (YZ surface in figure) along the extending direction of arms 412, AF Hall element 113 is easily influenced by positional displacement caused by resonance, which may deteriorate detection accuracy of AF Hall element 113. In contrast, in the present embodiment, AF Hall element 113 is disposed on the surface intersecting the extending direction of arms 412. Therefore, AF Hall element 113 is hardly influenced by positional displacement caused by resonance, thereby detecting the position of AF movable part 11 with high detection accuracy.

AF fixing part 12 includes magnet holder 121 and magnet part 122.

Magnet part 122 includes first magnet 122A and second magnet 122B. Each of first magnet 122A and second magnet 122B is a rectangular-parallelepiped permanent magnet having four poles on both surfaces (reference numeral thereof is omitted). In other words, in each of first magnet 122A and second magnet 122B, an N-pole and an S-pole equally appear on all of six surfaces. First magnet 122A is disposed along the X direction so as to face AF coil part 112. Second magnet 122B is disposed along the Y direction.

A size and a position of each of AF coil part 112 and first magnet 122A are set such that magnetic fields crossing two long-side parts of AF coil part 112 in the Y direction are directed opposite to each other. As a result, when AF coil part 112 is energized, Lorentz force directed in the same direction along the Z direction are generated on the two long-side parts of AF coil part 122.

As described above, first magnet 122A (AF magnet part) has a rectangular-parallelepiped shape with four poles on both surfaces and is disposed along the X direction (first direction orthogonal to optical axis direction). AF coil part 112 has an elliptical shape and is disposed such that the coil surface faces first magnet 122A and magnetic fluxes from first magnet 122A intersect the two long-side parts in the directions opposite to each other.

The AF voice coil motor is made up of first magnet 122A and AF coil part 112. In addition, OIS voice coil motor is made up of first magnet 122A, second magnet 122B, and OIS coil part 21. In other words, first magnet 122A is shared by AF magnet part and OIS magnet part.

First magnet 122A and second magnet 122B are used to detect the position of OIS movable part 10 in a plane orthogonal to the optical axis. Further, first magnet 122A is used to detect the position of AF movable part 11 in the optical axis direction. Note that a position detection magnet may be disposed on AF fixing part 12 (OIS movable part 10), besides first magnet 122A and second magnet 122B.

Magnet holder 121 is a square cylinder that has a substantially square shape in a planar view and has a space accommodating AF movable part 11. Magnet holder 121 includes magnet accommodation part 121a on one of side walls extending along the X direction, and includes magnet accommodation part 121b on one of side walls extending along the Y direction. First magnet 122A is disposed in magnet accommodation part 121a, and second magnet 122B is disposed in magnet accommodation part 121b.

Magnet holder 121 does not include a magnet accommodation part on the other side wall extending along the X direction and on the other side wall extending along the Y direction. Therefore, AF movable part 11 is disposed so as to be eccentric from a center axis of magnet holder 121 (axis that passes through intersection of diagonals of magnet holder 121 in planar view and is parallel to optical axis direction). In other words, the optical axis of lens part 2 disposed in AF movable part 11 is not coincident with the center axis of lens driving device 1.

Magnet holder 121 includes AF link fixing part 121c on the other side wall extending along the X direction. Magnet-holder fixing part 411 of AF supporting part 13 is fixed to AF link fixing part 121c.

Magnet holder 121 includes OIS link fixing parts 121d on ends of each of two sides extending along the Y direction (at four positions in total). First side supports 31 of OIS link member 30 are fixed to respective OIS link fixing parts 121d.

AF supporting part 13 supports AF movable part 11 to AF fixing part 12. In the present embodiment, as AF supporting part 13, a link member (hereinafter, referred to as "AF link member 13") that uses elasticity of elastomer is adopted as with OIS link member 30, in place of an existing plate spring. AF link member 13 is attached to AF fixing part 12 (magnet holder 121) in a cantilever manner.

AF link member 13 includes supporting main body 41 and stiffening parts 42. Supporting main body 41 includes magnet-holder fixing part 411, arms 412, and lens holder fixing parts 413.

Magnet-holder fixing part 411 has a shape corresponding to AF link fixing part 121c of magnet holder 121. Magnet-holder fixing part 411 includes boss accommodation parts 411a into which respective regulation bosses 111d of lens holder 111 are inserted. Lens holder fixing parts 413 each include a notch 413a corresponding to each of link attachment parts 111c of lens holder 111.

Arms 412 are each made of an elastomer material. Arms 412 each have a curved shape along a peripheral surface of lens holder accommodation part 111a. Each of two arms 412 (first arm and second arm) includes upper arm 412A and lower arm 412B that are provided apart from each other in the optical axis direction. A base end part of each of upper arm 412A and lower arm 412B is connected to magnet-holder fixing part 411, and is indirectly fixed to AF fixing part 12. A front end part of upper arm 412A and a front end part of lower arm 412B are coupled to each other by corresponding lens holder fixing part 413.

Each of upper arm 412A and lower arm 412B includes a biaxial hinge structure that is bent around two axes to enable AF movable part 11 to translate. Adopting the mechanical hinge structure using elasticity of elastomer makes it possible to move AF movable part 11 by small force. Accordingly, it is possible to achieve power saving.

Further, in the existing AF driving section, the AF movable part is clamped by the plate springs. Therefore, the number of components is large, the structure is complicated, and troublesome assembling work is necessary. In contrast, in the present embodiment, the structure is simple, and the number of components is small as compared with the existing structure. Accordingly, it is possible to facilitate assembling work.

More specifically, each of upper arm 412A and lower arm 412B includes two hinge parts 412a and 412b that are formed thinner than surroundings and have an axis in the X direction. In this case, hinge parts 412a and 412b are each made up of a hinge groove provided at an acute angle on an inner surface of each of upper arm 412A and lower arm 412B. Although the shape of the hinge groove is not particularly limited, the hinge groove preferably has an R shape.

Stiffening parts 42 are each disposed between two hinge parts 412a and 412b on each of arms 412. In this case, stiffening part 42 is provided in each of upper arm 412A and lower arm 412B. Stiffening parts 42 are each made of a material higher in rigidity than the elastomer material, namely, a material with small thermal expansion coefficient. Stiffening parts 42 are each formed through, for example, insert molding of a metal piece (for example, stainless steel piece). Further, for example, stiffening parts 42 are each formed through two-color molding with a resin material (for example, liquid crystal polymer).

Note that it is sufficient for each of stiffening parts 42 to have a size enough to suppress resonance of AF movable part 11. In an extreme case, a portion between hinge part 412a and hinge part 412b may be wholly made up of stiffening part 42.

The elastomer material has a relatively-large heat expansion coefficient. Therefore, arms 412 expand and increase in length in the extending direction as the ambient temperature becomes high. When arms 412 increase in length, arms 412 are easily influenced by resonance. Further, the position of AF movable part 11 in the plane orthogonal to the optical axis is displaced by an increased amount. As a result, the optical image stabilization may not be appropriately performed, which may cause deterioration of image quality. It is sufficient to perform the optical image stabilization in consideration of expansion of arms 412; however, this is not preferable because the calculation processing becomes complicated and a processing load is increased.

In contrast, in the present embodiment, stiffening parts 42 are disposed on arms 412. This improves rigidity as compared with a case where the whole of arms 412 is made of the elastomer material. As a result, the expansion of AF link member 13 in the arm extending direction is reduced. This increases a frequency of unnecessary resonance and a resonance peak is reduced. In the case where stiffening parts 42 are disposed, the resonance occurred at a frequency near 1 kHz is shifted to a higher frequency, and the resonance peak is drastically reduced. Further, positional displacement of AF movable part 11 in the plane orthogonal to the optical axis is also suppressed. Accordingly, stability is improved when the closed loop control is performed based on the detection signals by AF position detection part 113 and OIS position detection parts 23, and reliability of lens driving device 1 is improved.

Lens holder 111 is disposed inside arms 412. Notches 413a of AF link member 13 are fitted to and bonded to link attachment parts 111c of lens holder 111. As a result, lens holder 111 and AF link member 13 are coupled to each other. Since AF link member 13 is disposed so as to be close to a side surface of lens holder 111, it is possible to suppress a size of lens driving device 1 in a planar view and to stably support AF movable part 11.

Further, regulation bosses 111d of lens holder 111 are inserted into respective boss accommodation parts 411a of magnet-holder fixing part 411. Regulation bosses 111d function as regulation parts that regulate movement of AF movable part 11 in the optical axis direction. In other words, when AF movable part 11 is moved in the optical axis direction, an upper end (end part on light-receiving side in optical axis direction) or a lower end (end part on imaging side in optical axis direction) of each of regulation bosses 111d comes into contact with corresponding boss accommodation part 411a to regulate further movement of AF movable part 11.

Each of gaps between regulation bosses 111d and boss accommodation parts 411a is sealed with damper material 115. This makes it possible to further reduce resonance level of AF movable part 11.

As described above, supporting main body 41 includes magnet-holder fixing part 411 (fixing end) to be connected to AF fixing part 12, lens holder fixing parts 413 (free ends) to be connected to AF movable part 11, and arms 412 that couple magnet-holder fixing part 411 and lens holder fixing parts 413. Each of arms 412 is made of the elastomer material, includes two hinge parts 412a and 412b that are formed thinner than surroundings and have an axis in the X direction (direction orthogonal to optical axis direction), and is bent along with movement of AF movable part 11 in the optical axis direction such that hinge parts 412a and 412b are bent in directions opposite to each other (see FIG. 12A and FIG. 12B). This improves durability against bending operation repeatedly performed in autofocusing and reduces the risk of breakage due to impact such as falling.

As illustrated in FIG. 6, OIS fixing part 20 includes OIS coil part 21, base 22, and OIS position detection parts 23.

OIS coil part 21 is disposed at a position facing magnet part 122 in the optical axis direction. OIS coil part 21 includes first OIS coil 21A and second OIS coil 21B that respectively correspond to first magnet 122A and second magnet 122B.

First OIS coil 21A includes a planar coil having an elliptical shape. First OIS coil 21A is disposed on planar part 114a of FPC 114 such that a coil surface faces a surface of first magnet 122A on the imaging side in the optical axis direction. Second OIS coil 21B includes a planar coil having an elliptical shape as with first OIS coil 21A. Second OIS coil 21B is disposed on FPC 24 such that a coil surface faces a surface of second magnet 122B on the imaging side in the optical axis direction.

A size and a position of each of OIS coil part 21 and magnet part 122 are set such that magnetic fields directed opposite to each other in the Z direction cross two long-side parts of each of OIS coils 21A and 21B. As a result, when OIS coil part 21 is energized, Lorentz force directed in the same direction along the X direction or the Y direction is generated on the two long-side parts of OIS coil part 21.

Base 22 is a rectangular (in this case, square) member in a planar view, and has circular opening 22a at a position eccentric from the center axis of base 22 (axis that passes intersection of diagonals of base 22 in planar view and is parallel to optical axis direction). Base 22 includes FPC attachment part 22b on a peripheral edge of opening 22a. Planar part 114a of FPC 114 and FPC 24 are disposed on FPC attachment part 22b. In base 22, an area of a portion where OIS coil part 21 is not disposed is smaller than an area of a portion where OIS coil part 21 is disposed, and is minimized.

Two OIS position detection parts 23 are mounted on FPC 24. Each of OIS position detection parts 23 is, for example, a Hall element that detects a magnetic field with use of Hall effect (hereinafter, referred to as "OIS Hall elements 23"). OIS Hall elements 23 are disposed near one end of each of OIS coils 21A and 21B in the longitudinal direction in adjacent two sides of base 22.

OIS Hall elements 23 mainly detect a magnetic field formed by magnet part 122. The position of OIS movable part 10 in the plane orthogonal to the optical axis can be specified based on detection results of OIS Hall elements 23. Note that lengths of first magnet 122A and second magnet 122B in the extending direction are made larger than lengths of OIS coils 21A and 21B in order to face OIS Hall elements 23. Further, a position detection magnet may be disposed on OIS movable part 10, besides magnet part 122.

FPC 24 includes a power supply line (not illustrated) to feed power to second OIS coil 21B and OIS position detection parts 23, a signal line (not illustrated) for detection signals output from OIS position detection parts 23, and the like. An end part of FPC 24 is bent toward the imaging side in the optical axis direction, and connection terminal 24a (in this case, 10 pin) is provided at the end part. Note that a wire of FPC 24 may be embedded inside base 22 by, for example, insert molding. This makes it possible to omit FPC 24 mounted with OIS position detection parts 23. Therefore, it is possible to achieve downsizing and weight reduction of the camera module.

When OIS coil part 21 is energized in lens driving device 1, Lorentz force is generated on OIS coil part 21 by interaction of the magnetic field of magnet part 122 and a current flowing through OIS coil part 21 (Fleming's left-hand rule). A direction of Lorentz force is a direction (Y direction or X direction) orthogonal to the direction of the magnetic field (Z direction) and the direction of the current flowing through the long-side parts of OIS coil part 21 (X direction or Y direction).

Since OIS coil part 21 is fixed, reaction force acts on magnet part 122. The reaction force acts as driving force for OIS voice coil motor to sway OIS movable part 10 including magnet part 122 in the XY plane, and the optical image stabilization is accordingly performed. More specifically, an energizing current of optical OIS coil part 21 is controlled so as to cancel angler vibration of camera module A, based on a detection signal indicating the angular vibration from a vibration detection part (for example, gyro sensor not illustrated). At this time, the detection results of OIS position detection parts 23 are fed back, which allows for accurate control of translational movement of OIS movable part 10.

Figure 10A:
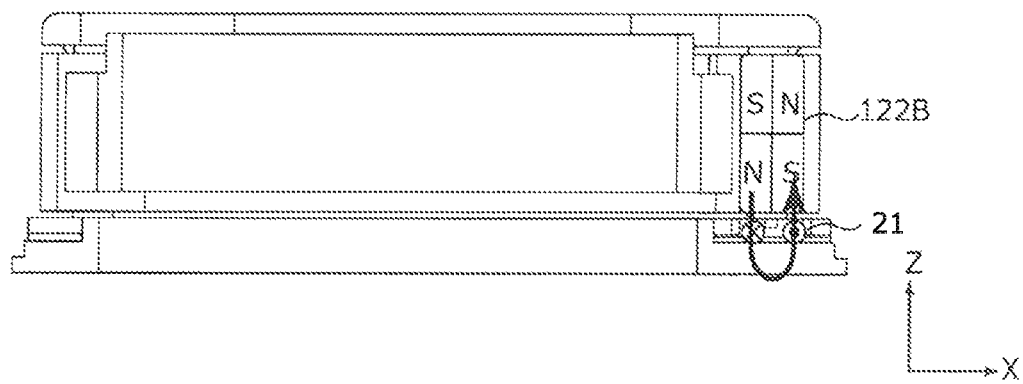
FIGS. 10A and 10B are diagrams each illustrating a bent aspect of an OIS supporting part (first side support)
Figure 10B:
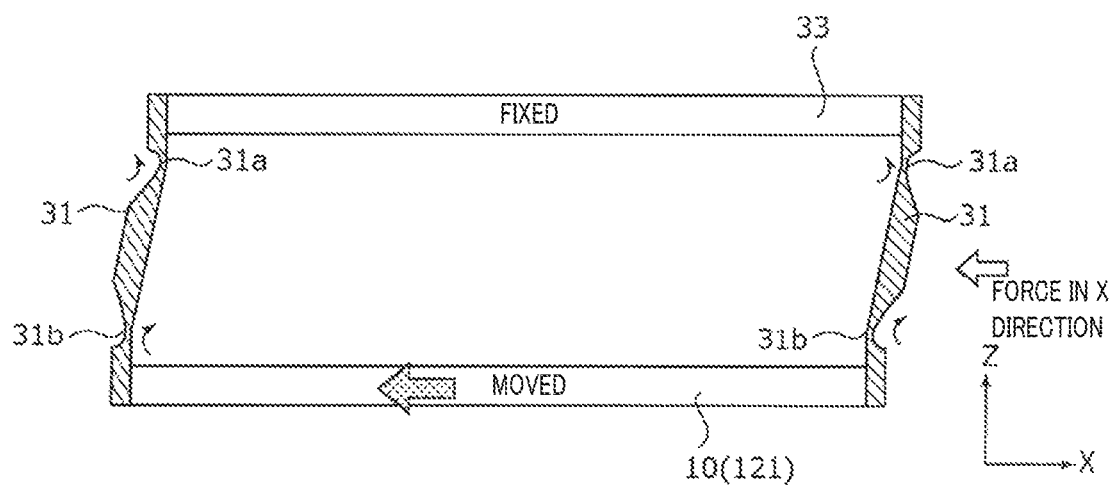

When force in the X direction acts on OIS movable part 10 through energization of OIS coil part 21 as illustrated in FIG. 10A, first side supports 31 of OIS link member 30 are bent as illustrated in FIG. 10B. In other words, as illustrated in FIG. 10B, portions located below Y hinge parts 31a of respective first side supports 31 are moved in the X direction together with OIS movable part 10 (magnet holder 121), whereas portions located above Y hinge parts 31b are not moved because the portions are indirectly connected to OIS fixing part 20 through upper frame 33 and second side supports 32. Accordingly, each of first side supports 31 is bent such that Y hinge parts 31a and 31b are bent in directions opposite to each other.

Figure 11A:
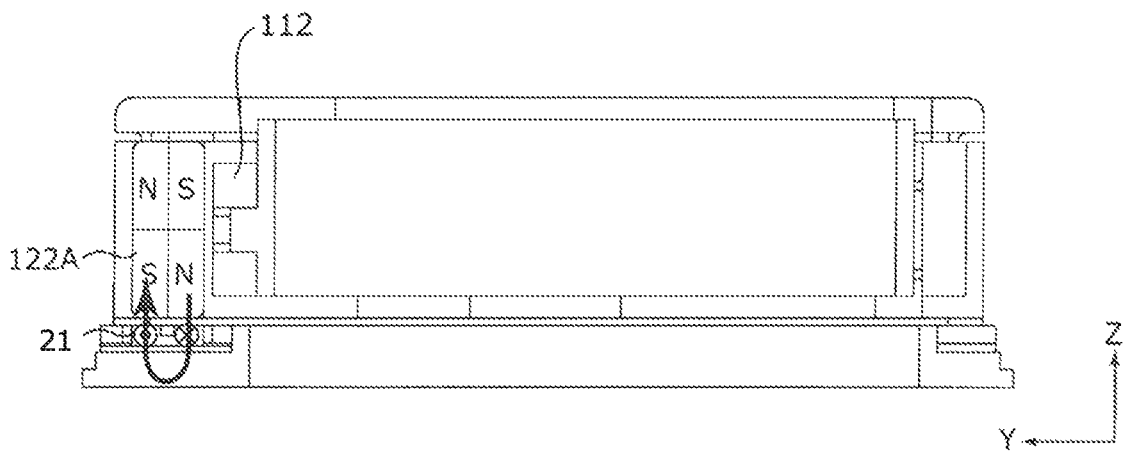
FIGS. 11A and 11B are diagrams each illustrating a bent aspect of an OIS supporting part (second side support)
Figure 11B:
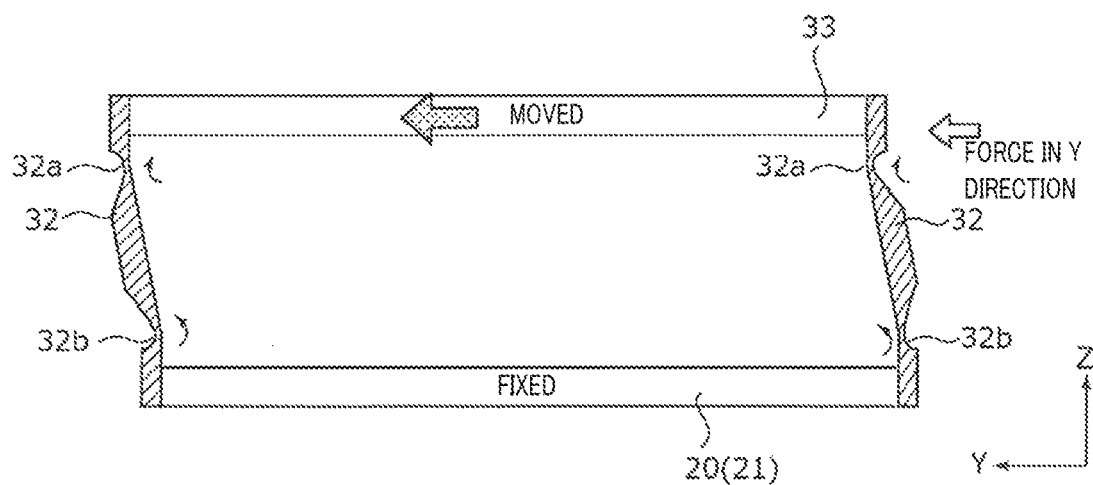

In contrast, when force in the Y direction acts on OIS movable part 10 through energization of OIS coil part 21 as illustrated in FIG. 11A, second side supports 32 of OIS link member 30 are bent as illustrated in FIG. 11B. In other words, portions located above X hinge parts 32a of respective second side supports 32 are moved in the Y direction together with OIS movable part 10 (magnet holder 121), whereas portions located below X hinge parts 32b are not moved because the portions are connected to base 22 of OIS fixing part 20. Accordingly, each of second side supports 32 is bent such that X hinge parts 32a and 32b are bent in directions opposite to each other.

Further, when AF coil part 112 is energized in lens driving device 1, Lorentz force is generated on AF coil part 112 by interaction of the magnetic field of first magnet 122A and the current flowing through AF coil part 112. The direction of Lorentz force is a direction (Z direction) orthogonal to the direction of the magnetic field (Y direction) and the direction of the current flowing through AF coil part 112 (X direction). The force acts as the driving force for AF voice coil motor to move AF movable part 11 including AF coil part 112 in the optical axis direction, and focusing is accordingly performed. A focal position is adjusted by, for example, analyzing a plurality of pieces of image information acquired by the imaging section (not illustrated) while AF movable part 11 is moved, and performing contrast evaluation.

Note that, during non-energization without performing focusing, AF movable part 11 is held in a state (hereinafter, referred to as "reference state") in which AF movable part 11 is suspended at a position between an infinite position and a macro position by AF link member 13. In other words, in OIS movable part 10, AF movable part 11 (lens holder 111) is supported so as to be displaceable on both sides in the Z direction while being positioned with respect to AF fixing part 12 (magnet holder 121) by AF link member 13. When focusing is performed, the direction of the current is controlled based on whether to move AF movable part 11 from the reference state to the macro position side or the infinite position side. Further, a magnitude of the current is controlled based on a moving distance of AF movable part 11.

Figure 12A:
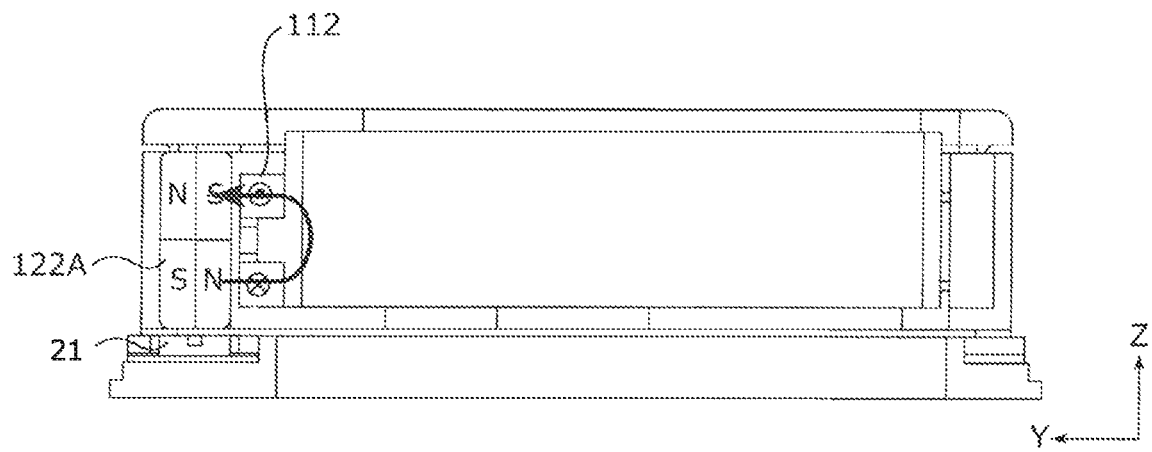
FIGS. 12A and 12B are diagrams each illustrating a bent aspect of the AF supporting part (arm)
Figure 12B:
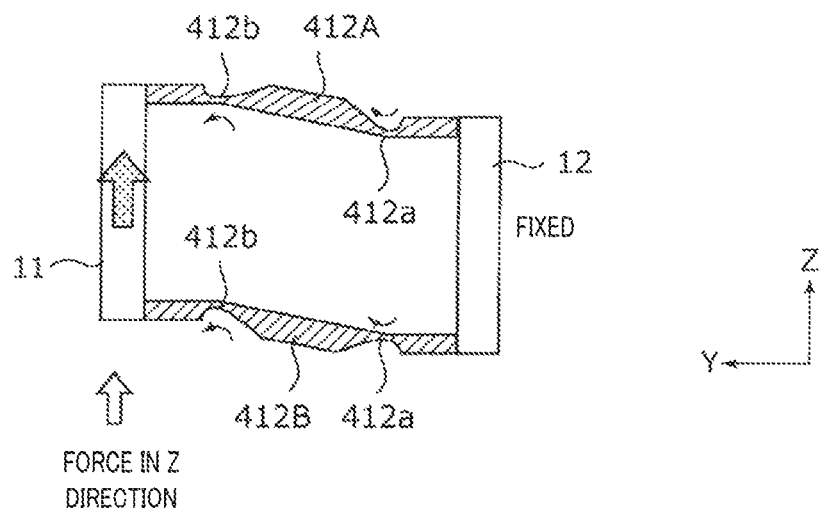

When force in the Z direction acts on AF movable part 11 through energization of AF coil part 112 as illustrated in FIG. 12A, arms 412 of AF link member 13 are bent as illustrated in FIG. 12B. In other words, as illustrated in FIG. 12B, portions located on left side of hinge parts 412 of respective arms 412 are moved in the Z direction together with AF movable part 11, whereas portions located on right side of hinge parts 412a are not moved because the portions are connected to AF fixing part 12 through magnet-holder fixing part 411. Accordingly, each of arms 412 is bent such that hinge parts 412a and 412b are bent in directions opposite to each other.

As described above, lens driving device 1 includes the optical image stabilization driving section that includes magnet part 122 (optical image stabilization magnet part), OIS coil part 21 (optical image stabilization coil part), and OIS supporting part 30 (optical image stabilization supporting part), and performs the optical image stabilization by swaying OIS movable part 10 in the plane orthogonal to the optical axis direction, relative to OIS fixing part 20 with use of the driving force from the OIS voice coil motor. Magnet part 122 is disposed around lens part 2. The OIS coil part 21 is disposed apart from magnet part 122. OIS supporting part 30 supports OIS movable part 10 (optical image stabilization movable part) including magnet part 122 while OIS movable part 10 is separated in the optical axis direction from OIS fixing part 20 (optical image stabilization fixing part) including OIS coil part 21. The OIS voice coil motor includes OIS coil part 21 and magnet part 122. OIS movable part 10 includes the autofocus driving section that includes AF coil part 112 (autofocus coil part), first magnet 122A (autofocus magnet part), and AF supporting part 13 (autofocus supporting part), and automatically achieves focusing by moving AF movable part 11 in the optical axis direction relative to AF fixing part 12 with use of the driving force from the AF voice coil motor. AF coil part 112 is disposed around lens part 2. First magnet 122A is disposed apart from AF coil part 112 in the radial direction. AF supporting part 13 supports AF movable part 11 (autofocus movable part) including AF coil part 112, with respect to AF fixing part 12 (autofocus fixing part) including first magnet 122A. The AF voice coil motor includes AF coil part 112 and first magnet 122A. A pair of OIS coil part 21 and magnet part 122 is disposed along a first side and a second side adjacent to each other. AF movable part 11 is disposed to be eccentric from the center axis of lens driving device 1 that is parallel to the optical axis direction. OIS fixing part 20 includes connection terminal parts 114a and 24a that are respectively disposed on the first side and the second side and are connected to the power feeding wire of OIS coil part 21.

More specifically, OIS supporting part 30 is made of the elastomer material and includes the biaxial hinge structure that supports OIS movable part 10 so as to be movable in the plane orthogonal to the optical axis. AF supporting part 13 is made of the elastomer material and includes the biaxial hinge structure that supports AF movable part 11 so as to be movable in the optical axis direction. Further, AF supporting part 13 includes supporting main body 41 and stiffening parts 42. Supporting main body 41 includes magnet-holder fixing part 411 (fixing end) to be connected to AF fixing part 12, lens holder fixing parts 413 (free ends) to be connected to AF movable part 11, and arms 412 coupling magnet-holder fixing part 411 and lens holder fixing parts 413. Each of arms 412 is made of the elastomer material, and includes two hinge parts 412a and 412b that are formed thinner than surroundings and have an axis in the direction orthogonal to the optical axis direction. Each of arms 412 is bent along with movement of AF movable part 11 in the optical axis direction such that two hinge parts 412a and 412b are bent in directions opposite to each other. Each of stiffening parts 42 is made of a material higher in rigidity than the elastomer material, and is disposed between two hinge parts 412a and 412b of each of arms 412.

Further, rear camera OC (camera module) includes first lens driving device 1A and second lens driving device 1B, lens parts 2A and 2B respectively corresponding to lens driving devices 1A and 1B, and the imaging section (not illustrated) that captures an object image formed by lens parts 2A and 2B. Lens driving devices 1A and 1B are arranged side by side in a positional relationship in which lens driving devices 1A and 1B are rotated by 90 degrees from each other in the plane orthogonal to the optical axis to prevent the connection terminal parts 114a and 24a from being located between the lens driving devices 1A and 1B (see FIG. 13).

Figure 13:
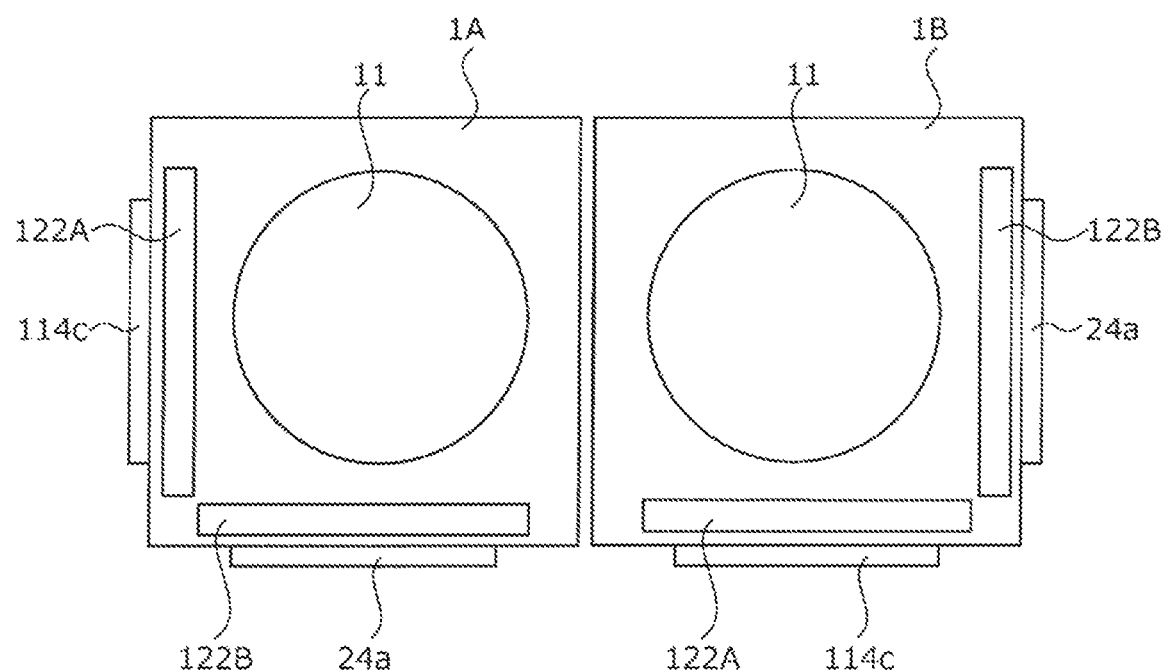
FIG. 13 is a diagram illustrating layout of magnet parts and connection terminal parts in the rear camera.

Since magnet part 122 is disposed only on adjacent two sides in each of lens driving devices 1A and 1B, two lens driving devices 1 are arranged side by side while being rotated by 90 degrees from each other in the plane orthogonal to the optical axis direction as illustrated in FIG. 13, which makes it possible to separate magnet parts 122 of respective lens driving devices 1 from each other. Accordingly, it is possible to achieve rear camera OC (dual camera) less in magnetic interference. Further, the separation distance between lens driving devices 1A and 1B is minimized and the area of the portion where the pair of OIS magnet part 21 and magnet part 122 is not disposed is minimized, which makes it possible to achieve downsizing of rear camera OC.

Moreover, since lens driving devices 1A and 1B are arranged side by side such that connection terminal parts 114a and 24a are not disposed between lens driving devices 1A and 1B, soldering work for connection terminal parts 114a and 24a is not complicated. Further, in each of lens driving devices 1A and 1B, AF movable part 11 is provided so as to be eccentric from the center axis of each of lens driving devices 1A and 1B. Therefore, if lens driving devices 1A and 1B are arranged side by side while being rotated by 180 degrees from each other, horizontal positions of respective lens parts 2A and 2B are deviated, and capturing regions may not coincident with each other. In contrast, in the case where lens driving devices 1A and 1B are arranged side by side while being rotated by 90 degrees from each other as with the present embodiment, the horizontal positions of respective lens parts 2A and 2B are coincident with each other. This makes it possible to suppress deviation of the capturing regions.

Further, according to the lens driving device 1, the risk of breakage of the optical image stabilization supporting part and the autofocus supporting part due to impact such as falling is extremely low. Moreover, the structure is simple, and the number of components is small as compared with the existing lens driving device. Furthermore, it is possible to drastically reduce influence of resonance on AF movable part 11. This makes it possible to secure high reliability and to enhance OIS sensitivity, and further to facilitate the assembling work.

Although the invention made by the present inventors has been specifically described above based on the embodiment, the present invention is not limited to the above-described embodiment and can be modified without departing from the scope of the present invention.

For example, it is sufficient for each of OIS supporting part 30 and AF supporting part 13 to be made of the elastomer material and to have the biaxial hinge structure, and the structure is not limited to the supporting structure illustrated in the embodiment.

Further, for example, each of first OIS coil 21A and second OIS coil 21B may include a divided structure including two coil parts. The two coil parts are made of, for example, one winding such that currents flow through the two coil parts in the same direction. In this case, corresponding OIS Hall element 23 is disposed at a position corresponding to the divided portions.

Figure 14:
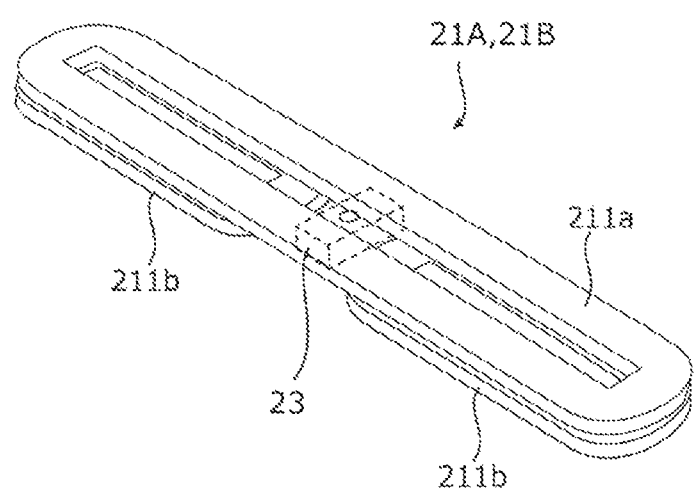
FIG. 14 is a diagram illustrating a modification of an OIS coil part.

Moreover, as illustrated in FIG. 14, each of first OIS coil 21A and second OIS coil 21B may include two-layer structure that includes elliptical upper coil layer 211a (first coil layer) and two lower coil layers 211b (second coil layers) divided in a longitudinal direction. Upper coil layer 211a and lower coil layers 211b are each made of, for example, one winding such that currents flows through upper coil layer 211a and lower coil layers 211b in the same direction. In this case, corresponding OIS Hall element 23 is disposed at a position corresponding to divided portions. The "position corresponding to divided portions" includes not only a position between the divided portions but also a position deviated from the divided portions in the optical axis direction.

Figure 15A:
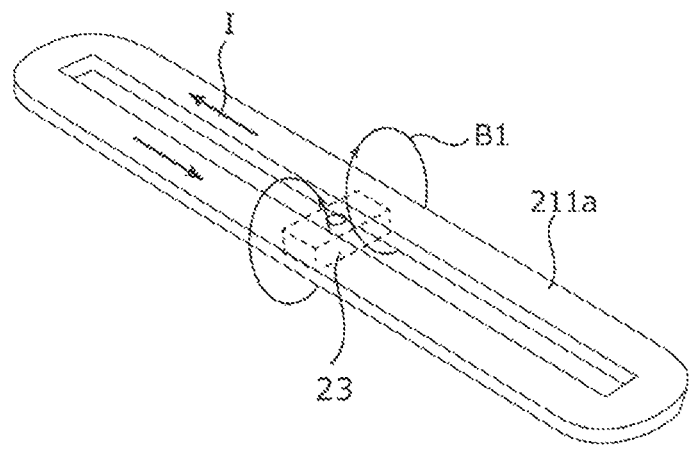
FIGS. 15A and 15B are diagrams each illustrating relationship between a magnetic flux generated by the OIS coil part and an XY position detection part according to the modification.
Figure 15B:
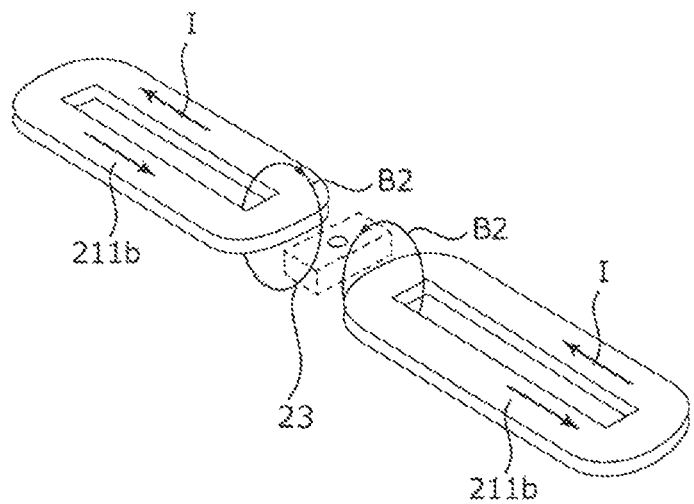

As illustrated in FIG. 15A and FIG. 15B, when current I flows through upper coil layer 211a and lower coil layers 211b in an arrow direction, magnetic field B1 generated by upper coil layer 211a crosses OIS Hall element 23 from bottom to top. In contrast, magnetic field B2 generated by lower coil layers 211b crosses OIS Hall element 23 from top to bottom. Accordingly, the magnetic fields formed around the OIS Hall element 23 by upper coil layer 211a and lower coil layers 211b are cancelled.

Accordingly, even when OIS coil part 21 is energized and a magnetic flux is generated by OIS coil part 21, the magnetic flux entering OIS Hall element 23 becomes small. This suppresses influence of the magnetic field by OIS coil part 21 on OIS Hall elements 23. In other words, electric resonance is suppressed, and a gain in a low-frequency band is improved even when the feed-back control is performed at a frequency of 150 Hz to 200 Hz. As a result, the detection sensitivity of OIS Hall elements 23 is improved, a settling time of OIS driving section is also reduced, and accuracy of the optical image stabilization is also improved.

Further, since upper coil layer 211a is not divided, large Lorentz force is generated on OIS coil part 21 as compared with a case where the whole of OIS coil part 21 is in the divided structure. This improves sensitivity of the optical image stabilization.

In addition, in a case where a metal material is adopted for each of stiffening parts 42 embedded in arms 412 of AF supporting part 13, this may be used as a power feeding line or a signal line for AF coil part 112 and AF Hall element 113. In this case, for example, a stretchable wire high in flexibility can be used to electrically connect each of stiffening parts 42 with a wire of base 22, and to electrically connect each of stiffening parts 42 with AF coil part 112 and AF Hall element 113.

In the present embodiment, a smartphone that is a mobile terminal including a camera has been described as an example of the camera-equipped device including camera modules CM1 and CM2; however, the present invention is applicable to a camera-equipped device that is an information device or a transportation device. The camera-equipped device as an information device is an information device that includes a camera module and a control section processing image information obtained by the camera module. Examples of the camera-equipped device as an information device include a mobile phone including a camera, a laptop computer, a tablet terminal, a portable game machine, a web camera, and an on-vehicle device including a camera (for example, back monitor device and drive recorder device). Further, the camera-equipped device as a transportation device is a transportation device that includes a camera module and a control section processing an image obtained by the camera module, and includes, for example, an automobile.

Figure 16A:
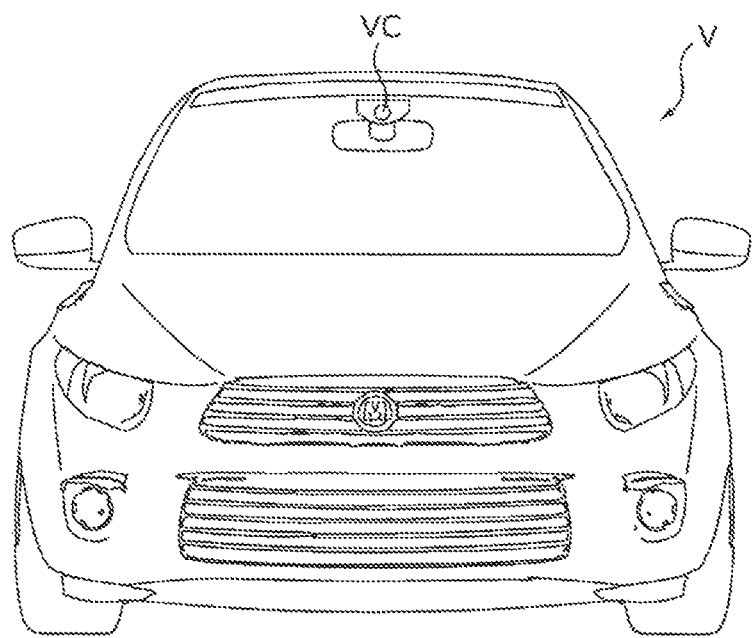
FIGS. 16A and 16B are diagrams each illustrating an automobile as a camera-equipped device equipped with an on-vehicle camera module.
Figure 16B:
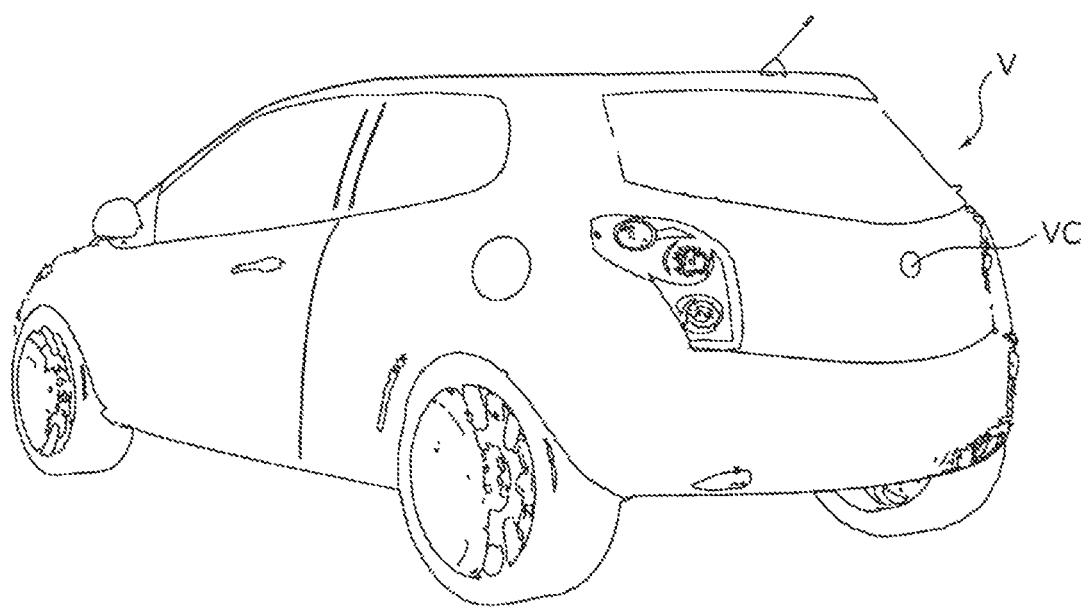

FIG. 16A and FIG. 16B are diagrams each illustrating automobile V as the camera-equipped device equipped with camera module VC (vehicle camera). FIG. 16A is a front view illustrating automobile V, and FIG. 16B is a rear perspective view illustrating automobile V. Automobile V is equipped with camera module A described in the embodiment as on-vehicle camera module VC. As illustrated in FIG. 16A and FIG. 16B, for example, on-vehicle camera module VC is attached to a front glass so as to be directed forward or attached to a rear gate so as to be directed backward. On-vehicle camera module VC is used for a back monitor, a drive recorder, collision avoidance control, automatic drive control, and the like.

The embodiment described above is considered to be illustrative in all respects and not restrictive. The scope of the present invention is defined by the appended claims rather than the above description. All changes or modifications made from the spirit and scope of the invention and equivalents thereof should be construed as falling within the scope of the invention.

The disclosure of Chinese Patent Application No. 201710034450.6, filed on Jan. 18, 2017, including the specification, drawings and abstract, is incorporated herein by reference in its entirety.

REFERENCE SIGNS LIST 1, 1A, 1B Lens driving device
2, 2A, 2B Lens part
3 Cover
10 OIS movable part (optical image stabilization movable part)
11 AF movable part (autofocus movable part)
111 Lens holder
112 AF coil part (autofocus coil part)
113 AF position detection part, AF Hall element
114 FPC
114c Connection terminal part
12 AF fixing part (autofocus fixing part)
121 Magnet holder
122 Magnet part
122A First magnet (autofocus magnet part, optical image stabilization magnet part)
122B Second magnet (optical image stabilization magnet part)
13 AF supporting part, AF link member (autofocus supporting part)
20 OIS fixing part (optical image stabilization fixing part)
21 OIS coil part (optical image stabilization coil part)
21A First OIS coil
21B Second OIS coil
22 Base
23 OIS position detection part, OIS Hall element
24 FPC
24a Connection terminal part
30 OIS supporting part, OIS link member (optical image stabilization supporting part)
31 First side support
31a, 31b Y hinge part
32 Second side support
32a, 32b X hinge part
33 Upper frame
41 Supporting main body
411 Magnet-holder fixing part (fixing end)
412 Arm
412a, 412b Hinge part
413 Lens holder fixing part (free end)

42 Stiffening part
CM1, CM2 Camera module
M Smartphone (camera-equipped device)

What is claimed is:

1. A lens driving device having a rectangular shape in a planar view,
the lens driving device comprising an optical image stabilization driving section that includes: a first and a second optical image stabilization magnet parts; a first and a second optical image stabilization coil parts; and an optical image stabilization supporting part, the optical image stabilization driving section being configured to perform optical image stabilization by swaying an optical image stabilization movable part in a plane orthogonal to an optical axis direction, relative to an optical image stabilization fixing part, with use of a driving force from an optical image stabilization voice coil motor, the first and second optical image stabilization magnet parts being disposed around a lens part, the first and second optical image stabilization coil parts being disposed apart from the first and second optical image stabilization magnet parts, respectively, the optical image stabilization supporting part supporting the optical image stabilization movable part including the first and second optical image stabilization magnet parts while the optical image stabilization movable part is separated in the optical axis direction from the optical image stabilization fixing part including the first and second optical image stabilization coil parts, the optical image stabilization voice coil motor including the first and second optical image stabilization coil parts and the first and second optical image stabilization magnet parts, wherein:
the optical image stabilization movable part includes an autofocus driving section that includes an autofocus coil part, an autofocus magnet part, and an autofocus supporting part, the autofocus driving section being configured to automatically achieve focusing by moving an autofocus movable part in the optical axis direction relative to an autofocus fixing part with use of a driving force from an autofocus voice coil motor, the autofocus coil part being disposed around the lens part, the autofocus magnet part being disposed apart from the autofocus coil part in a radial direction, the autofocus supporting part supporting the autofocus movable part including the autofocus coil part, with respect to the autofocus fixing part including the autofocus magnet part, the autofocus voice coil motor including the autofocus coil part and the autofocus magnet part,
a first pair including the first optical image stabilization coil part and the first optical image stabilization magnet part and a second pair including the second optical image stabilization coil part and the second optical image stabilization magnet part are disposed along a first side and a second side adjacent to each other of the rectangular shape of the lens driving device, respectively,
the autofocus movable part is disposed to be eccentric from a center axis of the lens driving device that is parallel to the optical axis direction,
the optical image stabilization fixing part includes a first and a second connection terminal parts,
the first connection terminal part is disposed on the first side and feed power to the first optical image stabilization coil part, and
the second connection terminal part is disposed on the second side and feed power to the second optical image stabilization coil part.

2. The lens driving device according to claim 1, wherein:
the optical image stabilization supporting part is made of an elastomer material and includes a biaxial hinge structure that supports the optical image stabilization movable part such that the optical image stabilization movable part is movable in a plane orthogonal to an optical axis, and
the autofocus supporting part is made of an elastomer material and includes a biaxial hinge structure that supports the autofocus movable part such that the autofocus movable part is movable in the optical axis direction.

3. The lens driving device according to claim 2, wherein:
the autofocus supporting part includes a supporting main body and a stiffening part,
the supporting main body includes: a fixing end connected to the autofocus fixing part; a free end connected to the autofocus movable part; and an arm that couples the fixing end and the free end,
the arm is made of an elastomer material and includes two hinge parts that are formed thinner than surroundings and have an axis in a direction orthogonal to the optical axis direction, and the arm is bent along with movement of the autofocus movable part in the optical axis direction to cause the two hinge parts to be bent in directions opposite to each other, and
the stiffening part is made of a material higher in rigidity than the elastomer material, and is disposed between the two hinge parts of the arm.

4. The lens driving device according to claim 3, wherein the stiffening part is made of a metal material or a resin material.

5. The lens driving device according to claim 3, wherein
the autofocus movable part includes a position detection part that is disposed on a surface intersecting an extending direction of the arm and detects a position of the autofocus movable part in the optical axis direction based on change of a magnetic field, and wherein
the autofocus fixing part includes a position detection magnet that is disposed to face the position detection part.

6. The lens driving device according to claim 3, further comprising a damper part that is interposed between the autofocus fixing part and the fixing end.

7. A camera module, comprising:
a first lens driving device and a second lens driving device each made up of the lens driving device according to claim 1;
the lens part corresponding to each of the first lens driving device and the second lens driving device; and
an imaging section that captures an object image formed by the lens part, wherein
the first lens driving device and the second lens driving device are arranged side by side in positional relationship in which the first lens driving device and the second lens driving device are rotated by 90 degrees from each other in a plane orthogonal to the optical axis to prevent the connection terminal parts from being located between the first lens driving device and the second lens driving device.

8. A camera-equipped device that is an information device or a transporting device, comprising the camera module according to claim 7.

9. The lens driving device according to claim 1, wherein the autofocus magnet part comprises at least one of the first and second optical image stabilization magnets.

10. The lens driving device according to claim 1, wherein the autofocus supporting part is fixed on at least one side of the rectangle where the autofocus magnet part is not disposed, and elastically supports the auto-focusing movable part with respect to the auto-focusing fixing part in a cantilever fashion.

\* \* \* \* \*